United States Patent
Semba et al.

(10) Patent No.: US 7,016,077 B2
(45) Date of Patent: Mar. 21, 2006

(54) COLOR IMAGE PROCESSING APPARATUS AND METHOD, AND COMPUTER-READABLE RECORDING MEDIUM IN WHICH COLOR IMAGE PROCESSING PROGRAM IS RECORDED

(75) Inventors: Satoshi Semba, Kawasaki (JP); Masayoshi Shimizu, Kawasaki (JP); Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 943 days.

(21) Appl. No.: 09/821,013

(22) Filed: Mar. 30, 2001

(65) Prior Publication Data

US 2001/0035988 A1    Nov. 1, 2001

(30) Foreign Application Priority Data

Apr. 14, 2000 (JP) .............................. 2000-114360
Oct. 12, 2000 (JP) .............................. 2000-311486

(51) Int. Cl.
*G06F 15/00* (2006.01)
*G06K 1/00* (2006.01)

(52) U.S. Cl. ........................ 358/1.9; 358/2.1; 358/520; 358/522; 358/518

(58) Field of Classification Search ................ 358/1.9, 358/2.1, 520, 522, 518
See application file for complete search history.

(56) References Cited

U.S. PATENT DOCUMENTS 3,709,686 A * 1/1973 Erdell .............................. 430/7
5,016,039 A * 5/1991 Sosa et al. ...................... 396/50
5,331,441 A * 7/1994 Akuzawa et al. ........... 358/530
5,537,522 A * 7/1996 Shibuta et al. .............. 345/619
6,014,457 A * 1/2000 Kubo et al. .................. 382/167
6,031,641 A * 2/2000 Hoshino ...................... 358/521

FOREIGN PATENT DOCUMENTS

JP   HEI 08-221546    8/1996
JP   2585754          12/1996

OTHER PUBLICATIONS

Yoshihisa Terada, et al., "Detection of Area of Person in a Still Image", Proceedings of the 57th Annual Conference of Information Processing Society of Japan (IPSJ) 5E-09.
P. J. Phillips, "Gender and Ethic Classification of Face Images", IEEE 0-8186-8344 Sep. 1998, published 1998.
Juha Katajamaki, et al., "Image Dependent Gamma Selection Based on Color Palette Equalization and a Simple Lightness Model", The 7th Color Imaging Conference, published 1999.

* cited by examiner

*Primary Examiner*—Kimberly Williams
*Assistant Examiner*—Michael Burleson
(74) *Attorney, Agent, or Firm*—Staas & Halsey LLP

(57) ABSTRACT

A color image processing apparatus and method capable of changing/converting an inadequate-exposure image or an over-exposure image into an apparently natural image or a pleasing-lightness image. The apparatus is equipped with an object color designating section for designating an object color in an input color image, an optimum color setting section for setting an optimum color corresponding the object color, a lightness conversion factor obtaining section for obtaining a lightness conversion factor based on the object color and the optimum color, and a lightness converting section for converting the lightness of the color image using the lightness conversion factor to create a lightness-changed color image. This apparatus is useful in correcting lightness over a color image input from a digital camera, an image scanner or the like.

12 Claims, 29 Drawing Sheets

FIG. 4

| OPTIMUM COLOR | VALUE OF COLOR (L*, a*, b*) |
|---|---|
| FAIR WOMAN | (77,11,11) |
| FAIR MAN | (75,16,14) |
| AVG-COMPLECTED WOMAN | (76,22,19) |
| ⋮ | |
| YELLOW-GREEN VEGETABLE | (59,-26,33) |
| GREEN VEGETABLE | (44,-27,11) |
| ⋮ | |
| YOUNG LEAVES | (70,-38,54) |
| GREEN-LEAVED TREE | (38,-26,30) |
| ⋮ | |
| SKY OF JAPAN | (46,-6,-45) |
| SKY OF SOUTH COUNTRY | (38,10,-51) |
| ⋮ | |

FIG. 5

| OBJECT COLOR (Rs, Gs, Bs) | OPTIMUM COLOR (L*t, a*t, B*t) |
|---|---|
| (Rs1, Gs1, Bs1) | (L*t1, a*t1, b*t1) |
| (Rs2, Gs2, Bs2) | (L*t2, a*t2, b*t2) |
| (Rs3, Gs3, Bs3) | (L*t3, a*t3, b*t3) |
| (Rs4, Gs4, Bs4) | (L*t4, a*t4, b*t4) |

FIG. 7

| OBJECT COLOR (Rss, Gss, Bss) | OPTIMUM COLOR (L*t, a*t, B*t) |
|---|---|
| (Rss1, Gss1, Bss1) | (L*t1, a*t1, b*t1) |
| (Rss2, Gss2, Bss2) | (L*t2, a*t2, b*t2) |
| (Rss3, Gss3, Bss3) | (L*t3, a*t3, b*t3) |
| (Rss4, Gss4, Bss4) | (L*t4, a*t4, b*t4) |

FIG. 9

| OPTIMUM COLOR TYPE | OPTIMUM COLOR (L*, a*, b*) | WEIGHTING FACTOR G |
|---|---|---|
| FAIR WOMAN | (77,11,11) | 5 |
| FAIR MAN | (75,16,14) | 5 |
| AVG-COMPLECTED WOMAN | (76,22,19) | 5 |
| ⋮ | ⋮ | ⋮ |
| YELLOW-GREEN VEGETABLE | (59,-26,33) | 4 |
| GREEN VEGETABLE | (44,-27,11) | 4 |
| ⋮ | ⋮ | ⋮ |
| YOUNG LEAVES | (70,-38,54) | 1 |
| GREEN-LEAVED TREE | (38,-26,30) | 1 |
| ⋮ | ⋮ | ⋮ |
| SKY OF JAPAN | (46,-6,-45) | 3 |
| SKY OF SOUTH COUNTRY | (38,10,-51) | 3 |
| ⋮ | ⋮ | ⋮ |

FIG. 10

| OBJECT COLOR (Rss, Gss, Bss) | OPTIMUM COLOR (L*t, a*t, B*t) | WEIGHTING FACTOR |
|---|---|---|
| (Rss1, Gss1, Bss1) | (L*t1, a*t1, b*t1) | 5 |
| (Rss2, Gss2, Bss2) | (L*t2, a*t2, b*t2) | 5 |
| (Rss3, Gss3, Bss3) | (L*t3, a*t3, b*t3) | 3 |
| (Rss4, Gss4, Bss4) | (L*t4, a*t4, b*t4) | 1 |

LOW  HIGH

COLOR IMAGE PROCESSING APPARATUS AND METHOD, AND COMPUTER-READABLE RECORDING MEDIUM IN WHICH COLOR IMAGE PROCESSING PROGRAM IS RECORDED

BACKGROUND OF THE INVENTION

1. Field of the Invention:

The present invention relates to a color image processing apparatus and method and a computer-readable recording medium in which a color image processing program is recorded, and more particularly to the following color image processes:

(a1) If an input image is different in lightness from an intended image hue to an improper exposure condition at the time of inputting the image, the lightness of the input image are changed so as to approximate to those of the intended image.

(a2) The lightness, hue and chroma of the input image are converted into those of a desired image.

(a3) Even if a color image of an object (particularly a person) has been taken against the light, a characteristic color (particularly a skin color of the person) is changed to a preferred lightness as compared to the original image without changing the lightness of the whole image.

2. Description of the Related Art:

A human being remembers colors of occasionally seen objects, such as skins, sky and trees, as sensuous "memorized colors". To this end, a human being remembers the "memorized color" of a particular object as an "optimum color" he/she has been felt to be a most preferred color, and feels it as an undesired or unnatural color if the color of a particular object in the image is different from the "optimum color".

As illustrated in FIG. 18 of the accompanying drawings, when an image of an object (apple) 72 is taken by a digital camera 73 under a light 71 having a proper lightness, light emitted by the light 71 is reflected on the object 72 and then enters the digital camera 73 as reflected light 74, whereupon the entered light is converted into electrical output values by three CCDs (Charge Coupled Device) 75 corresponding to RGB (Red, Green, Blue). An example of the respective output values of the Red, Green and Blue CCDs 75 is shown in FIG. 19.

FIG. 20 illustrates another situation in which an image of the object (apple) 72 is taken by the same digital camera 73 under a light 76 having an inadequate lightness. Also in this situation, light emitted from the light 76 is emitted on the object 72 and then enters the digital camera 73 as reflected light 77, whereupon the entered light is converted into electrical output values respectively by the Red, Green and Blue CCDs 75. An example of the respective output values of the Red, Green and Blue CCds 75 is shown in FIG. 21.

FIG. 22 shows the output values of the CCDs 75 in terms of L*C* when an image of the object 72 is taken. As shown in FIG. 22, the output values (FIG. 19) of the CCDs 75 in the case of the proper exposure are converted into color values, i.e. the original color values of the object, corresponding to a position designated by reference character 78. On the other hand, the output values (FIG. 21) of the CCDs 75 in the case of the inadequate exposure are converted into color values corresponding to a position designated by reference 79; these color values, namely, lightness (L*) and chroma (C*), each decrease as compared to that in the case of the proper exposure.

Also, when an image of the object is taken against the light, a color in the resulting image would occasionally be far different from the memorized or optimum color.

FIG. 23 illustrates the last-named situation in which an image of an object is taken against the light. In this against-the-light situation, the object (person 105) and a background 103 are simultaneously taken by a digital camera 102.

In this situation, a problem is the location of a light source (sun 101). Light 107 emitted from the sun 101 toward the background 103 strikes the surface of the background 103 whose image is to be taken by the digital camera 102. In the meantime, the light 106 emitted from the sun 101 toward the object 105 strikes only the rear surface of the object whose image is not to be taken by the digital camera 102.

As the result, an against-the-light photograph 108 shown in FIG. 24 would be taken. In this photograph 108, the image of the background 110 is normally taken, but the image of only the most significant object, i.e. the person 109, would result in inadequate exposure so that the colors of the person 109 would be far different from the optimum colors. Though attached importance to either the background 110 or the object (person 109), the lightness of such image cannot be best. As an alternative, a moderate or reasonable lightness, namely, a compromise for both of the background 110 and the object 109 would be an optimum lightness.

Under these circumstances, a color image processing apparatus for changing/converting an inadequate-exposure image, an over-exposure image, or an against-the-light image into an apparently natural image or a desired-color image has been demanded.

As a solution when an image whose lightness is improper or a color image whose color of a skin, sky and tree is different from its memorized color is input, there is currently known a color correcting method in which the input color is corrected by making changes to various parameters such as tone curve and color balance of RGB.

However, the amount of change of parameters is not proportional to the amount of correction of color a human being feels, proposing no guideline for correction of color. Consequently, color correction must be done on a try-and-error basis so that a person without specialized knowledge could not obtain a desired image.

In order to solve this problem, an improved input system is disclosed in Japanese Patent Publication No. 2585754 (hereinafter called "Prior Art Reference 1"). According to Prior Art Reference 1, correction of color is made in the following procedure:

(b1) An input image is pre-scanned. Then, using a fussy reasoning, image classification information is created based on information, such as histogram, density average and maximum density, about the pre-scanned image.

(b2) When a request is made by the user, finishing information, e.g. gray points, light/dark, preference, tone and motif/pattern, is obtained in accordance with the request.

(b3) Processing parameters for correction of the color image are obtained based on the image classification information created in (b1) and the finishing information obtained in (b2).

(b4) Using the processing parameters obtained in (b3), the color image is processed to optimize the lightness.

As another solution, an image editing method and system is disclosed in Japanese Patent Laid-Open Publication No. Hei 8-221546 (hereinafter called Prior Art Reference 2). According to Prior Art Reference 2, a skin color of an input image is optimized by making a change of color in the following procedure:

(c1) A color value as the optimum color of the skin color is prepared.

(c2) An color image is displayed, whereupon an area of the skin color to be corrected is designated by the user.

(c3) In the area designated in (c2), a color (point) to be met with the optimum color is designated.

(c4) Whole of the area designated in (c2) about the point designated in (c3) is corrected so as to assume colors about the optimum color.

However, according to the above-mentioned Prior Art Reference 1, there are the following problems:

(d1) Even if an input image is either a night-view image, whose density average is originally high, or a snow-covered-mountain-view image, whose density average is originally low, the input image would be converted into an image having the same density average. As the result, a lightness histogram (distribution of lightness) of the night-view image, whose density average is originally high, would be biased toward the low (dark) side as shown in FIG. 25A, while a lightness histogram (distribution of lightness) of the snow-covered-mountain-view image, whose density average is originally low, would be biased toward the high (light) side as shown in FIG. 25B. Either of the image having the lightness histogram of FIG. 25A and the image having the lightness histogram of FIG. 25B would be converted/changed into an image whose lightness histogram is moderate at maximum as shown in FIG. 25C. The resulting image would be far remote in lightness from the original image.

(d2) Since no memorized color is not considered, it is impossible to make a color change in accordance with the optimum color.

(d3) A lightness histogram of the against-the-light image has a peak at either of the low (dark) and high (light) sides as shown in FIG. 26; namely, the density average of the whole against-the-light image would be a substantially moderate value (normal value) Therefore, the against-the-light image would be recognized as not too far biased in light-dark balance and hence would be seen as a normal-lightness image so that a lightness correction cannot be made.

According to the above-mentioned Prior Art Reference 2, since only the area designated by the user is changed, combination of the color of the color-converted area and the color of the boundary area therearound would be out of harmony. For example, when an image of a person is taken in a gloomy room, it would result in an inadequate exposure. If a face of the person is designated for change or conversion of color and a skin color is converted into the optimum color, the skin color will be pleasing while the unchanged portions, such as head hair and clothing, other than the designated area will be left unchanged as dark. The resulting image would be an unnatural image with only the skin color being conspicuous.

SUMMARY OF THE INVENTION

With the foregoing problems in view, it is a first object of the present invention to convert an inadequate-exposure image or an over-exposure image into an apparently natural image or an image which is pleasing in lightness, hue and chroma.

A second object of the invention to convert an against-the-light image into an apparently natural image by changing a characteristic color of an object into a preferred-lightness color as compared to the original color without considerably changing the lightness of the whole against-the-light image.

In order to attain the first object, according to a first generic feature of the invention, there is provided a color image processing apparatus comprising: object color designating means for designating an object color to be converted in an input color image; optimum color setting means for setting an optimum color corresponding to the object color designated by the object color designating means; lightness conversion factor obtaining means for obtaining a lightness conversion factor based on the object color and the optimum color; and lightness converting means for converting the input color image in lightness using the lightness conversion factor to create a lightness-changed color image.

Preferably, the lightness converting means may convert the object color in lightness using the lightness conversion factor to create a lightness-changed object color. This apparatus may further comprise hue and chroma converting means for converting the lightness-changed color image in hue and chroma based on a color difference between the lightness-changed object color and the optimum color.

As another preferable feature, the object color designating means may designate a plurality of object colors, the optimum color setting means may set a plurality of optimum colors respectively corresponding to the plural object colors, and the lightness conversion factor obtaining means may obtain a plurality of individual lightness conversion factors respectively corresponding to the plural object colors and the plural optimum colors, and also may obtain an average weighting value of the plural individual lightness conversion factors as the lightness conversion factor, using weighting factors respectively corresponding to the plural optimum colors.

With the color image processing apparatus according to the first generic feature, in correcting an apparently displeasing color image, the object color and the optimum color are obtained in set by the object color designating means and the optimum color setting means. Using these two color values, the lightness of the color image is converted by both the lightness conversion factor obtaining means and the lightness converting means.

After the image has been accurately converted in lightness, the hue and chroma of the lightness-changed color image is converted by the hue and chroma converting means so as to substantially coincide with the optimum color.

Further, when an optimum color is set for the object color designated by the object color designating means, a weighting factor representing a degree of accuracy of such optimum color is set. If there exist a plurality of sets of object colors and optimum colors, a weighting average value of the individual lightness conversion factors is obtained so that a lightness conversion factor is obtained with importance attached to a set whose weighting factor is large.

According to a second generic feature of the invention, there is provided a color image processing apparatus comprising: object color designating means for designating an object color to be converted in an input color image; optimum color setting means for setting an optimum color corresponding to the object color designated by the object color designating means; preliminary lightness conversion amount obtaining means for obtaining a preliminary lightness conversion amount in accordance with a differential value in lightness between the object color and the optimum color; practical lightness conversion amount obtaining means for obtaining a practical lightness conversion amount by compensating the preliminary lightness conversion amount so as to decrease the preliminary lightness conversion amount commensurate with the largeness of the preliminary lightness conversion amount; lightness conversion factor obtaining means for obtaining a lightness conversion factor based on the practical lightness conversion amount, the object color and the optimum color; and lightness converting means for converting the input color image in lightness using the lightness conversion factor to create a lightness-changed color image.

Preferably, the practical lightness conversion amount obtaining means may obtain the lightness conversion amount such as to approximate a predetermined value as the preliminary lightness conversion amount increases.

With the color image processing apparatus according to the second generic feature, firstly an object color and an optimum color are obtained in set by the object color designating means and the optimum color setting means, whereupon a preliminary lightness conversion amount corresponding to a differential value in lightness between the object color and the optimum color is obtained by the preliminary lightness conversion amount obtaining means. If the image is an against-the-light image, the differential value is large.

Then the practical lightness conversion amount obtaining means converts the preliminary lightness conversion amount so as to reduce it depending on the largeness of the preliminary lightness conversion amount. Namely, if the preliminary lightness conversion amount is small, the image is judged as not an against-the-light image, whereupon a value to meet the object color with the optimum lightness is set as the practical lightness conversion amount. On the other hand, if the preliminary lightness amount is large, the image is judged as an against-the-light image, whereupon the preliminary lightness conversion amount is reduced and the reduced amount is set as the practical lightness conversion amount.

Further, if the preliminary lightness conversion amount is small, the practical lightness conversion amount obtaining means obtain a practical lightness conversion amount by increasing the decrease of the preliminary lightness conversion amount as largeness of the preliminary lightness conversion amount increases, using the practical lightness conversion amount without making substantially no change in preliminary lightness conversion amount. At that time a possible value in preliminary lightness conversion amount is determined so as to approximate a constant value. Therefore, even if the preliminary lightness conversion amount is remarkably large hue to the severe against-the-light image, the maximum conversion amount is limited to the constant value so that lightness conversion can be achieved without impairing the balance of lightness of the whole image.

According to a color image processing apparatus, a color image processing method applied to this color image processing apparatus and a color image processing program recording medium for realizing the color image processing apparatus, following advantageous results can be achieved:

(1) Because the color image is corrected in lightness using the object image and the optimum color, it is possible to set an optimum color very close to the original color of the object. Consequently, it is possible to exactly grasp a difference of lightness in a color image based on the object color and the optimum color so that correction of lightness to meet with the lightness of the optimum color can be achieved more precisely as compared to the conventional correction of lightness using a histogram. It is therefore possible to convert an inadequate-exposure image or an over-exposure image into an apparently natural image or an image whose lightness is pleasing.

(2) Since the lightness-changed color image is changed in chroma and hue so as to substantially coincide with the optimum color, it is possible to realize an intended color neatly and to convert the lightness, hue and chroma of a color image into those which are desirable.

(3) If there exist a plurality of sets of object colors and optimum colors in correction of lightness, a lightness conversion factor with importance attached to a larger-weighting-value set is obtained by obtaining a weighting average value of the individual lightness conversion factors. Namely, it is possible to make correction of lightness with importance attached to the lightness of the optimum color whose weighting value is large so that precise correction of lightness can be achieved.

(4) Partly since values of various optimum colors are previously held in an optimum color database and partly because an optimum color corresponding to a particular object color is selected from the optimum color database (to set) by the optimum color setting means, it is possible to facilitate setting the optimum color.

(5) By previously holding weighting values corresponding to each of optimum colors, it is possible to calculate a weighting average of the individual lightness conversion factors with maximum ease using the lightness conversion factor obtaining means.

(6) Partly since the preliminary lightness conversion amount is corrected so as to decrease the largeness of the preliminary lightness conversion amount in accordance the largeness of the preliminary lightness conversion amount and partly since the resulting preliminary lightness conversion amount is used as a practical lightness conversion amount, it is possible not only to optimize the lightness of the object color of an against-the-light image but to convert the lightness of the against-the-light image into an optimum lightness of the whole image. It is therefore possible to convert a characteristic color of an object (particularly a skin color of a person) into a relatively pleasing lightness as compared to the original image without considerably changing the lightness of the whole against-the-light image so that the against-the-light image can be converted into a apparently natural image.

(7) Since a possible value for the practical lightness conversion amount is determined so as to approximate a constant value, the maximum conversion amount is limited to the constant value so that correction of lightness can be made without impairing the balance of lightness of the whole image.

(8) Since general color correction based on a lightness distribution (histogram) or a maximum/minimum/average value of pixel information in the color image is made before formal lightness correction, it is guaranteed that the whole image after general lightness correction is substantially proper in lightness. It is therefore possible to guarantee that the lightness of the whole image remains substantially proper even though the formal lightness correction is made by the lightness conversion means and even though fine adjustment of lightness is made so as to improve the memorized color.

BRIEF DESCRIPTION OF THE DRAWINGS

FIG. 4 is a diagram showing a specific example of optimum color database in the apparatus of the first embodiment;

FIG. 5 is an exemplary table showing object colors and optimum colors in sets created in the apparatus of the first embodiment;

FIG. 7 is an exemplary table showing lightness-changed object colors and optimum colors in sets created in the apparatus of the second embodiment;

FIG. 9 is a diagram showing an exemplary optical color database including weighting values respectively corresponding to optimum colors in the apparatus of the third embodiment;

FIG. 10 is an exemplary table showing object colors, optimum colors and weighting values in set created in the apparatus of the third embodiment;

DESCRIPTION OF THE PREFERRED EMBODIMENTS

Various preferred embodiments of the present invention will now be described with reference to the accompanying drawings.

(1) FIRST EMBODIMENT

Figure 1:
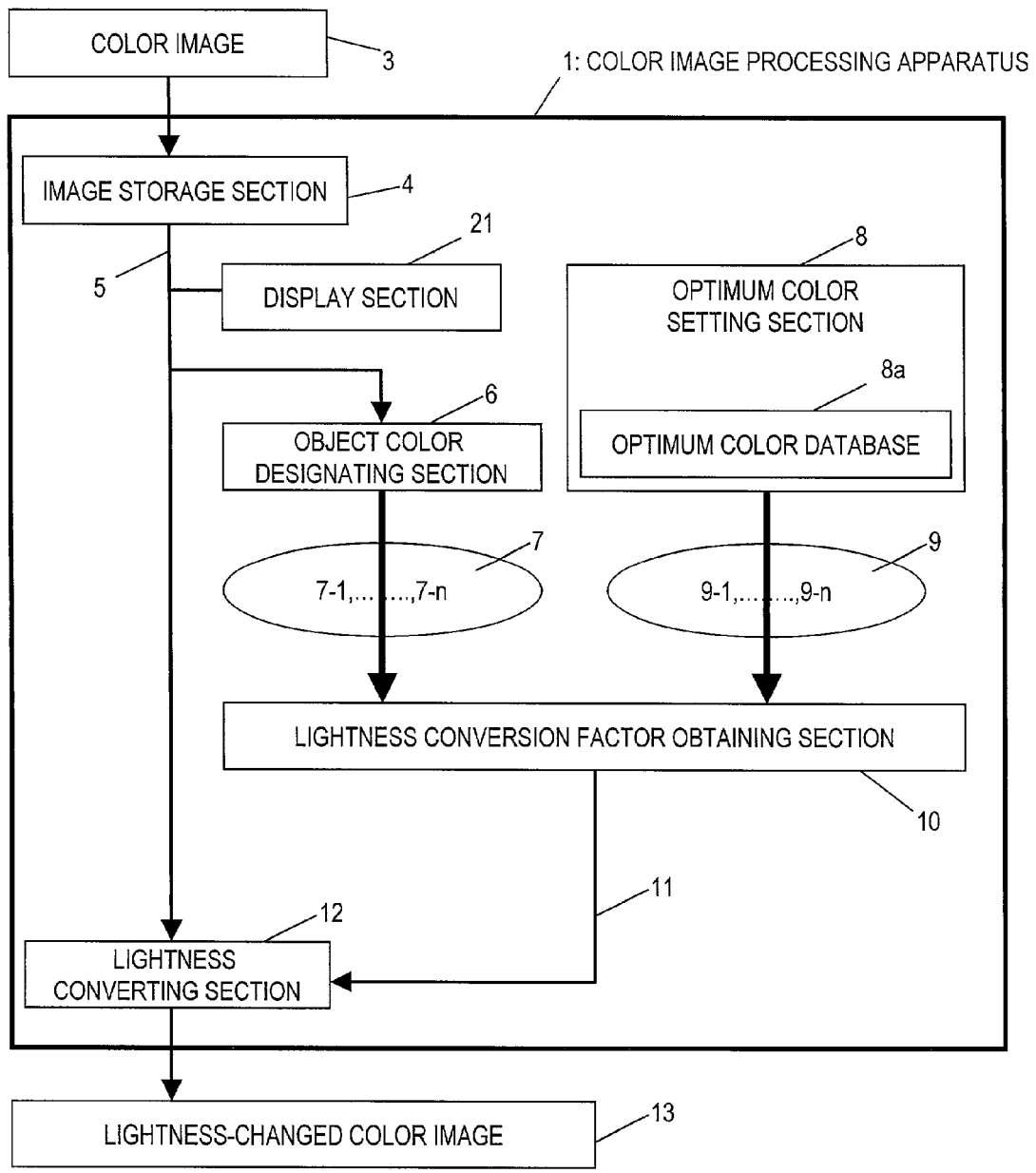
FIG. 1 is a block diagram showing a color image processing apparatus according to a first embodiment of the present invention.

FIG. 1 is a block diagram showing a color image processing apparatus (hereinafter also called the apparatus) 1 according to a first embodiment of the invention. The apparatus 1 of the first embodiment corrects a color image, which is input from a digital camera, an image scanner, etc., in lightness, and comprises an image storage section 4, a display section 21, an object color designating section 6, an optimum color setting section 8, a lightness conversion factor obtaining section 10, and a lightness converting section 12. This color image processing apparatus 1 is practically realized by a computer system (e.g., a personal computer).

The computer system realizing the color image processing apparatus 1 is equipped with a non-illustrated CPU to which a memory (ROM, RAM, etc.) serving as the image storage section 4, a display (CRT, PDP, LCD, etc.) serving as the display section 21, and a mouse 22 (FIG. 2) are connected via a non-illustrated bus line.

The image storage section 4 stores a color image 3 from an image input device such as a digital camera or an image scanner. The display section 21 displays a color image 5 held in the image storage section 4 and displays various kinds of information (FIGS. 2 and 3) needed for designating an object color and setting an optimum color.

Further, in the memory, a color image processing program which instructs the computer system to function as the object color designating section 6, the optimum color setting section 8, the lightness conversion factor obtaining section 10 and the lightness converting section 12, all shown in FIG. 1, is stored. Namely, as the CPU reads out the color image processing program from the memory via the bus line and executes it, these functions are realized as the color image processing apparatus 1 of the first embodiment, carrying out a color image processing method of the invention.

The above-mentioned color image processing program is provided in the form of a computer-readable recording medium, such as a flexible disk, a CD-ROM or the like. For use, the computer system reads the color image processing program from the recording medium, transfers the program to an internal or external storage device to store. Alternatively, the color image processing program may be recorded in a storage device (recording medium), such as a magnetic disc, an optical disc or a magneto-optical disk, whereupon the program may be loaded onto the computer system from the storage device via a communication line.

In realizing the functions as the object color designating section 6, the optimum color setting section 8, the lightness conversion factor obtaining section 10 and the lightness converting section 12, the color image processing program stored in an internal storage device (i.e., the memory in the first embodiment) is executed by a microprocessor (i.e., the CPU in the first embodiment). Alternatively, the computer system may directly read the color image processing program recorded in a recording medium to execute the program.

In the first embodiment, the term "computer" includes hardware and an operating system, meaning hardware to be operated under control of the operation system. In an alternative in which an application program solely operates hardware without using an operation system, the hardware itself is equivalent to a computer. The hardware includes at least a microprocessor, such as a CPU, and a device for reading a computer program recorded in a recording medium.

The color image processing program of the first embodiment includes program codes for instructing the above-mentioned computer to function as the object color designating section 6, the optimum color setting section 8, the lightness conversion factor obtaining section 10 and the lightness converting section 12. Alternatively part of these functions may be realized by an operation system rather than a color image processing program (application program).

Further, the recording medium of the first embodiment may be one selected from various recording mediums including, in addition to the above-mentioned flexible disc, CD-ROM, DVD, magnetic disc, optical disc and magneto-optical disc, IC card, ROM cartridge, magnetic tape, punched card, other internal storage devices (memory such as RAM or ROM) of the computer, external storage devices, and computer-readable mediums such as printed matter labeled with symbols, e.g. bar code.

Various functions (as the object color designating section 6, the optimum color setting section 8, the lightness conversion factor obtaining section 10 and the lightness converting section 12) to be realized by the CPU will now be described in detail.

Figure 2:
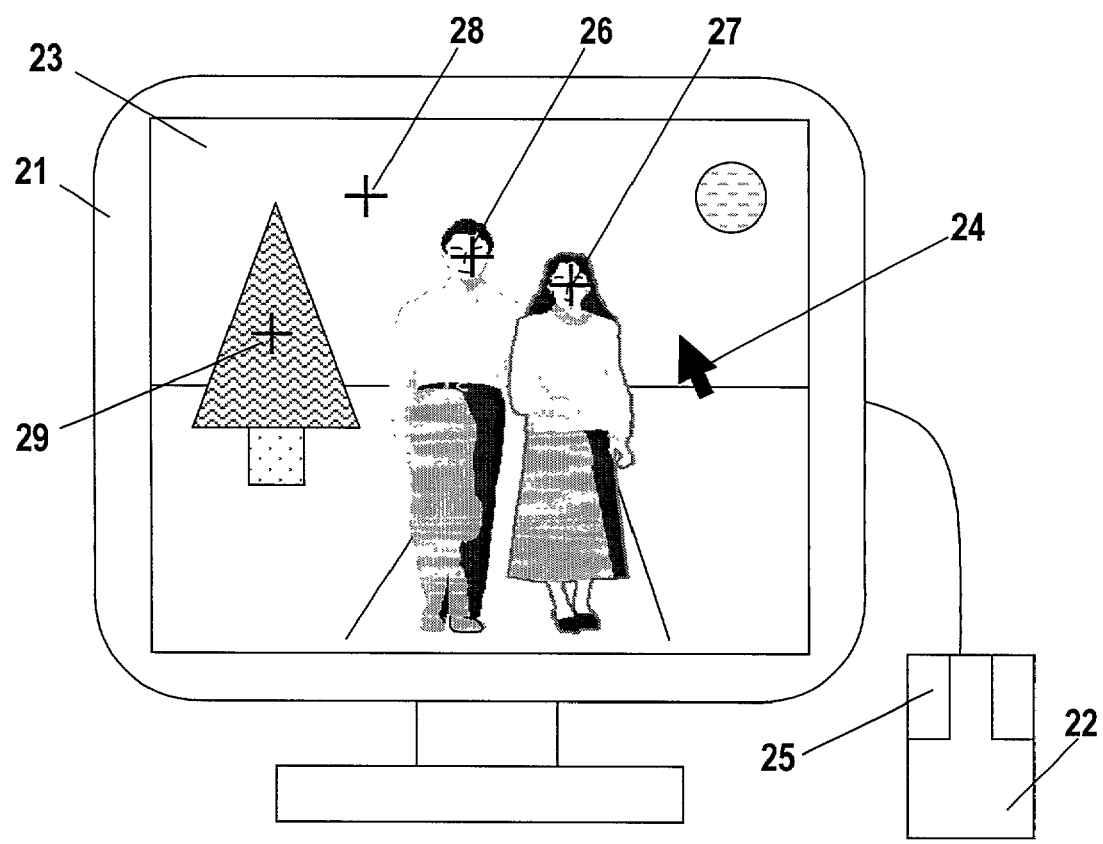
FIG. 2 is a diagram showing an exemplary display screen when an object color is designated in the apparatus of the first embodiment.

In the first embodiment, as mentioned above, a color image 3 from the image input device, such as a digital camera or an image scanner is transferred to and stored in the image storage section 4 inside the color image processing apparatus 1. Alternatively the color image 3 may be stored in an external storage device connected to the color image processing apparatus 1. When the user correct the color image, a color image 5 held in the image storage section 4 is transferred to the display section 21, whereupon the color image 5 is displayed on the display section 21 as shown in FIG. 2.

The object color designating section 6 designates an object color 7, among various images 23 (color images 5 held in the image storage section 4) displayed on the display section 21, as the user operates the mouse 22. At that time, one or more object colors 7 may be designated; in the example of FIG. 1, n object colors 7-1 through 7-n are designated.

The optimum color setting section 8 has an optimum color database 8a (FIG. 4) previously holding values of various memorized colors, such as male face color, female face color, color of sky and color of tree, and selects optimum colors 9 (9-1 through 9-n), which are to be respectively paired with one or more object colors 7 (7-1 through 7-n) designated by the object color designating section 6, from the optimum color database 8a and sets the optimum colors 9 as selected. As a result, a table showing object colors and optimum colors in pairs is created as shown in FIG. 5.

The object color 7 may be automatically retrieved from the color image 5 for execution of correction instead of making the user designate the object color 7. This automatic retrieving technology is exemplified by Yoshihisa Terada and Yoh'ichi Muraoka, "DETECTION OF AREA OF PERSON IN A STILL IMAGE", 57th Conference of Information Processing Society, Japan (See 5E-09).

The setting of the optimum color 9 also may be automatically discriminated using position information of the object color 7 in the image for execution of correction instead of making the user designate the optimum color 9. This automatic discriminating technique is exemplified by Srinivas Gutta and Harry Wechsler, "GENDER AND ETHNIC CLASSIFICATION OF FACE IMAGES", International Conference on Automatic Face and Gesture Recognition 3rd, pp. 194–199.

Further, a value of an optimum color 9 corresponding to a particular object color 7 also may be manually set and input by the user upon every designation of an object color 7, instead of selecting the color value of the optimum color from the optimum color database 8a.

The lightness conversion factor obtaining section 10 obtains a lightness conversion factor $\alpha$, based on the designated object color 7 and the designated optimum color 9, using a later-described formula (8).

The lightness converting section 12 changes a color image 5 by later-described formulas (5) through (7) using the lightness conversion factor $\alpha$. As a result, a lightness-changed color image 13 is obtained.

The color image correction procedure according to the color image processing apparatus 1 of the first embodiment will now be described with reference to FIGS. 2 through 5.

Figure 3:
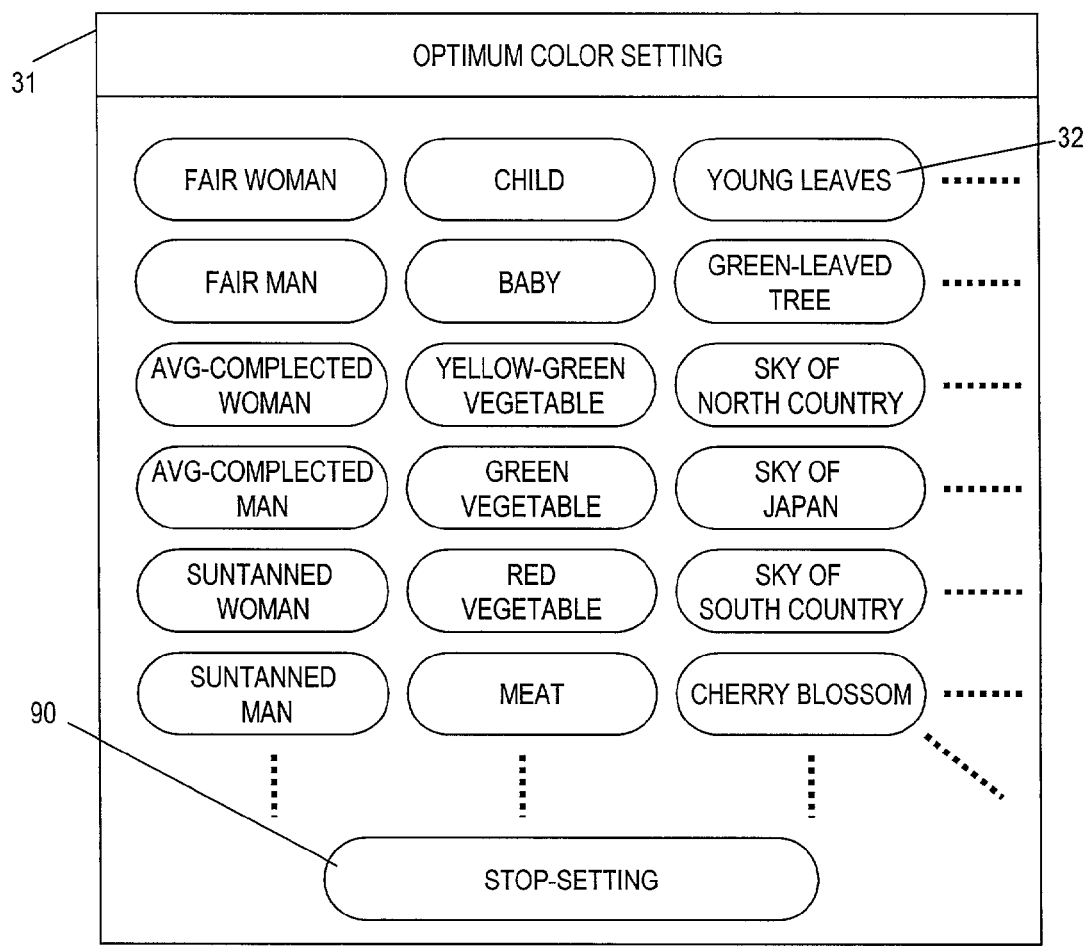
FIG. 3 is a diagram showing an exemplary display of an optimum color setting panel used during the designating of an optimum color in the apparatus of the first embodiment.

FIG. 2 is a diagram showing an exemplary display screen when an object color is designated in the apparatus of the first embodiment, FIG. 3 is a diagram showing an exemplary display of an optimum color setting panel 31 used during the designating of an optimum color in the apparatus of the first embodiment, FIG. 4 is a diagram showing a specific example of optimum color database 8a in the apparatus of the first embodiment, and FIG. 5 is an exemplary table showing object colors and optimum colors in sets created in the apparatus of the first embodiment.

First of all, as shown in FIG. 2, a color image 5 stored in the image storage section 4 is displayed on the display section 21 as a displayed image 23. A cursor 24 is a pointing device movable in response to operation of the mouse 22. The user moves the cursor 24 to the position of an object pixel in the displayed image 23 and depresses a mouse button 25. In the position where the mouse button 25 is depressed, "+" designating the object color 7 is marked.

Position information (information about the position pointed by the cursor 24) about the position where the mouse button 25 is depressed is obtained by the object color designating section 6, and based on this position information, a color value of image of the position is designated as the object color 7.

In the displayed image 23 of FIG. 2, four colors, i.e. a male face color 26, a female face color 27, a color of sky 28 and a color of tree 29, are designated as object colors 7.

And the optimum color setting section 8 is equipped with the optimum color database 8a previously holding values of various memorized colors, such as male face color, female face color, color of sky and color of tree. One or more optimum colors 9 to be respectively paired with one or more object colors 7 designated by the object color designating section 6 are selected from the optimum color database 8a (and set) by the optimum color setting section 8.

The optimum color setting procedure by the optimum color setting section 8 will now be described in detail with reference to FIGS. 3 through 5.

In the color image processing apparatus 1, when an object color 7 is designated, the optimum color setting panel 31 is displayed on the display section 21 as shown in FIG. 3. The optimum color setting panel 31 includes a plurality of type setting buttons 32 respectively labeled with names of various optimum colors, and a "stop-setting" button 90 to be depressed when setting of optimum color(s).

In use, the user depresses the type setting button(s) 32 of the optimum color(s) 9 corresponding to the object color(s) 7 using the mouse 22 or the like. In the optimum color setting section 8, a value of the optimum color 9 is obtained as retrieval is carried out over the optimum color database 8a of FIG. 4 in response to the depressed type setting button 32, creating the table of FIG. 5, which shows the object colors and the optimum colors in pairs.

The lightness conversion factor obtaining section 10 consults the table created by the optimum color setting section 8 and obtains, for each pair of the object color 7 and the optimum color 9, a lightness factor α in accordance with a lightness converting method using the lightness converting section 12.

An ordinary example will now be described in which an input color image 3 is represented by numerical values (Ri, Gi, Bi) as normalized from sRGB space values (0 through 255), an optimum color 9 is represented by L*a*b* space values (L*t, a*t, b*t) meeting with the feeling of a human being, and an object color 7 is represented by numerical values (Rs, Gs, Bs) as normalized from sRGB space values (0 through 255). The relation between L*a*b* space values and values of three primary colors of sRGB space is expressed via an XYZ space by the following formulas (1) through (4):

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_s \\ G_s \\ B_s \end{bmatrix} \quad (1)$$

$$L^* = 116 \cdot Y^{1/3} - 16 \quad (2)$$

$$a^* = 500[X^{1/3} - Y^{1/3}] \quad (3)$$

$$b^* = 200[X^{1/3} - Y^{1/3}] \quad (4)$$

In the lightness converting section 12, a conversion formula to be used in correction of an input color image 5, namely, conversion formulas for converting color values (Ri, Gi, Bi) of the input color image 5 into color values (Rsp, Gsp, Bsp) of a lightness-changed color image 13 consists of the following formulas (5) through (7):

$$R_{sp} = 1 - (1 - R_i)^\alpha \quad (5)$$

$$G_{sp} = 1 - (1 - G_i)^\alpha \quad (6)$$

$$B_{sp} = 1 - (1 - B_i)^\alpha \quad (7)$$

A lightness conversion factor α, together with a value Yt calculated from the lightness value L*t of an optimum color 9 and values (Rs, Gs, Bs) of an object color 7, is obtained as satisfying the following equation (8):

$$Y_t = a(1-(1-R_s)^\alpha) + b(1-(1-G_s)^\alpha) + c(1-(1-B_s)^\alpha)$$

where $a = 0.2126 \times 100$ $b = 0.7152 \times 100$, and $c = 0.0722 \times 100 \quad (8)$ Here, the individual values of factors a, b, c are exemplary parameters when color values of the input color image 5 are in terms of an sRGB space, and a lightness conversion factor α is calculated by solving the above equation (8) with numerical calculation such as dichotomy.

If the number of object colors 7 is n, lightness conversion factors α1 through αn are calculated for the respective object colors 7-1 through 7-n in the lightness conversion factor obtaining section 10. One of these lightness conversion factors α1 through αn or an average value of them may be used as the lightness conversion factors α.

Given that the table (showing object colors and optimum colors in pairs) of FIG. 5 has been created, the lightness conversion factor obtaining section 10 calculates four kinds of lightness conversion factors and then obtains one lightness conversion factor α based on these four lightness factors.

Of course, if the number of the designated object color(s) 7 is 1, the lightness conversion factor α obtained for the object color 7 is used as it is.

Finally, using the lightness conversion factor α and the above formulas (5) through (7), the lightness converting section 12 converts values (Ri, Gi, Bi) of an input color image 5 into values (Rsp, Gsp, Bsp) of a lightness-changed color image 13.

According to the color image processing apparatus 1 of the first embodiment, the object color(s) 7 (7-1 through 7-n) in an apparently displeasing color image 5 (displayed image 23) and the optimum color(s) 9 (9-1 through 9-n) are obtained by the object color designating section 6 and the optimum color setting section 8, respectively. Using these two color values, the lightness conversion factor obtaining section 10 and the lightness converting section 11 converts the color image 5 in lightness to obtain a lightness-changed color image 13.

Since the color image 5 is thus converted in lightness using the object color(s) 7 (7-1 through 7-n) and the optimum color(s) 9 (9-1 through 9-n), optical color(s) 9 (9-1 through 9-n) very close to the original color(s) of the object, which color(s) is composed of the object color(s) 7 (7-1 through 7-n).

Accordingly, since a different in lightness of the color image 5 can be exactly grasped from the object color(s) 7 (7-1 through 7-n) and the optimum color(s) 9 (9-1 through 9-n), it is possible to correct the lightness of the color image 5 accurately as compared to the conventional lightness correction using a histogram. It is therefore possible to convert an inadequate-exposure image, an over-exposure image or a biased-in-color-of-light into an apparently natural image or an image whose lightness, hue and chroma are pleasing.

Since, with values of various optimum colors previously held in the optimum color database 8a, the optimum color setting section 8 selects from the optimum color database 8a the optimum color(s) 9 (9-1 through 9-n) corresponding to the object color(s) 7 (7-1 through 7-n), it is possible to facilitate setting of the optimum colors 9 (9-1 through 9-n).

(2) SECOND EMBODIMENT

Figure 6:
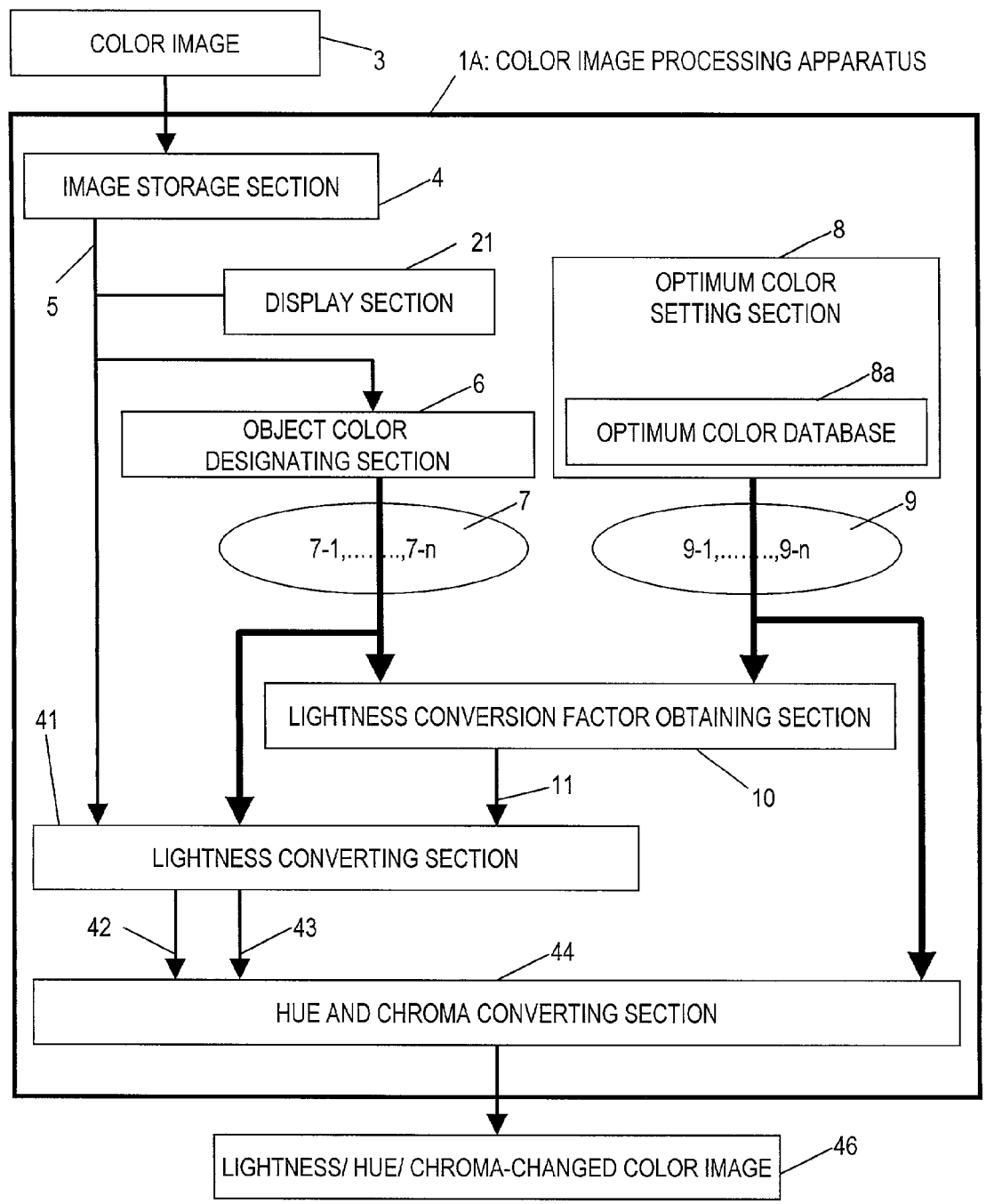
FIG. 6 is a block diagram showing a color image processing apparatus according to a second embodiment of the invention.

FIG. 6 is a block diagram showing a color image processing apparatus (hereinafter also called the apparatus) 1A according to a second embodiment of the invention. Like reference numbers designate similar parts or elements throughout several views of different embodiments.

As shown in FIG. 6, the color image processing apparatus 1A is identical in construction with the apparatus 1 of FIG. 1 except that a lightness converting section 41 substitutes for the lightness converting section 10 and a hue and chroma converting section 44 is added. Accordingly, in the second embodiment, the procedure from inputting a color image 3 to obtaining a lightness conversion factor α takes place likewise in the first embodiment.

In the second embodiment, the functions of the lightness converting section 41 and the hue and chroma converting section 44, like the object color designating section 6, the optimum color setting section 8 and the lightness conversion factor obtaining section 10 of the first embodiment, are realized as a CPU of a computer system executes an application program (color image processing program).

The lightness converting section 41 of the second embodiment, like the lightness converting section 10 of the first embodiment, performs conversion of lightness of a color image 5 using a lightness conversion factor α and creates a lightness-changed color image 42 (Rsp, Gsp, Bsp).

Further, the lightness converting section 41 performs lightness conversion, using a lightness conversion factor α, also for an object color 7 designated from the table of FIG. 5, which shows object colors and optimum colors in pairs, and creates values (Rss, Gss, Bss) of lightness-changed object color 43.

As the result, the table of FIG. 5 is updated as shown in FIG. 7. FIG. 7 is a table showing lightness-changed object colors and optimum colors as created in the second embodiment.

And the hue and chroma converting section 44 receives the lightness-changed color image 42 and the lightness-changed object color 43 from the lightness converting section 41, and also the optimum color 9 from the optimum color setting section 8.

Then the hue and chroma converting section 44 obtains a formula for conversion of hue and chroma (a*p, b*p) in the lightness-changed color image 42 based on a color difference between the lightness-changed object color 43 and the optimum color 9 (9-1 through 9-n), and then converts the hue and chroma of the lightness-changed color image 42 in accordance with this conversion formula. At that time, conversion of hue and chroma is carried out for a color whose color difference from the lightness-changed object color 43 is equal to or less than a constant value.

For example, a conversion discriminating value is calculated by the following formula (9), and using the value D, discrimination is made whether a difference between the lightness-changed color image 42 and the lightness-changed object color 43 in the pixel is equal to or less than a constant value (10 in the following conversion discriminating formula). If the value D is equal to smaller than zero, then no conversion is made for the hue and chroma, and if the value D is larger than zero, then conversion by the following converting formula (10) is made for the hue and chroma (a*p, b*p) of the corresponding pixel.

$$D = 10 - \sqrt{(L^*_s - L^*_p)^2 + (a^*_s - a^*_p)^2 + (b^*_s - b^*_p)^2} \quad (9)$$

$$\left.\begin{array}{l} a^*_p \rightarrow a^*_p + \dfrac{(a^*_t - a^*_s) \cdot D}{10} \\[4pt] b^*_p \rightarrow b^*_p + \dfrac{(b^*_t - b^*_s) \cdot D}{10} \end{array}\right\} \quad (10)$$

Values (Rsp, Gsp, Bsp) of a lightness-changed color image 42 and values (Rss, Gss, Bss) of a lightness-changed object color 43 are previously converted into color values (L*p, a*p, b*p) and (L*s, a*s, b*s), respectively, of L*a*b* space. And the optimum color 9 is given in terms of values (L*t, a*t, b*t) of L*a*b* space likewise in the first embodiment.

If as the object colors 7, four colors, such as two skin colors, color of sky and color of tree, have been designated as shown in FIG. 2, comparison of color values are carried out four times between the individual pixels and the four kinds of object colors 7, and for each pixel, discrimination of conversion and execution of the conversion are made using the above conversion discriminating formula (9) and converting formula (10). By this procedure, a color image 46 whose lightness, hue and chroma have been changed is created in the hue and chroma converting section 44.

According to the color image processing apparatus 1A of the second embodiment, after the lightness of a color image 5 has been changed, hue and chroma (a*p, b*p) of the lightness-changed color image 42 is converted so as to make the object color(s) 7 (7-1 through 7-n) substantially coincide with the optimum color(s) 9 (9-1 through 9-n) by the hue and chroma converting section 44. It is therefore possible to realize an intended color neatly and to convert the lightness, hue and chroma of a color image into those which are desirable.

In converting the object color(s) 7 (7-1 through 7-n) into the optimum color(s) 9 (9-1 through 9-n) in the color image processing apparatus 1A of the second embodiment, changing/conversion of lightness is carried out with respect to whole of the color image, while changing/conversion of hue and chroma is carried out with respect to only the pixel whose color value is slightly different from the object color(s) 7 (7-1 through 7-n).

Therefore, influence of converting the object color(s) 7 (7-1 through 7-n) into the optimum color(s) 9 (9-1 through 9-n) occurs with respect to only a color which is slightly different from the object color(s) 7 (7-1 through 7-n) but does not cause colorcast in monochrome areas. Further, since correction of lightness is carried out over the whole image, there is no difference in lightness between the reproduced colors changed to optimum colors and the colors off the object so that none of the reproduced colors changed to optimum colors would become sharply light, causing no incompatibility as if floating.

(3) THIRD EMBODIMENT

Figure 8:
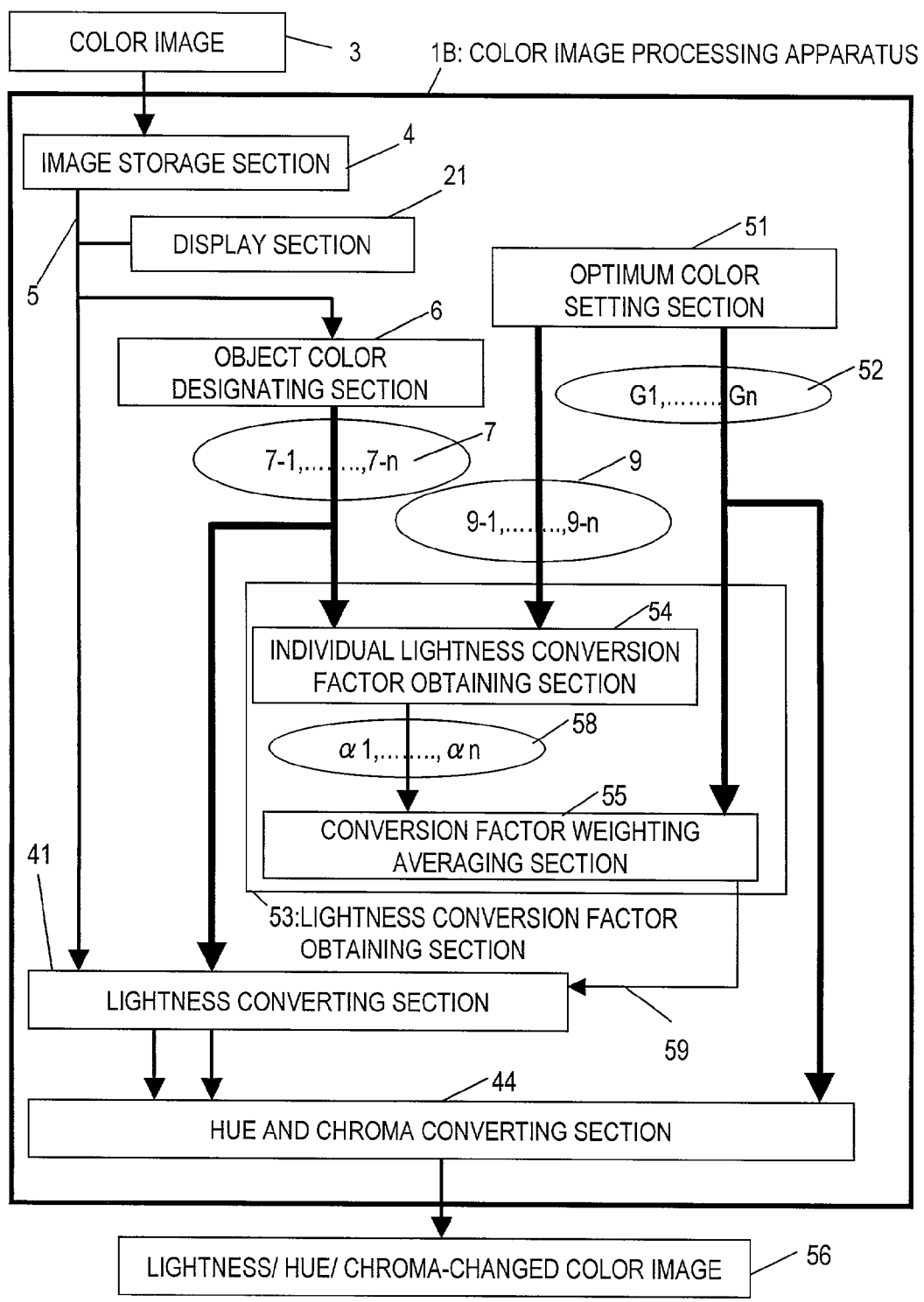
FIG. 8 is a block diagram showing a color image processing apparatus according to a third embodiment of the invention.

FIG. 8 is a block diagram showing a color image processing apparatus 1B according to a third embodiment of the invention. Like reference numbers designate similar parts or elements throughout several views of different embodiments.

As shown in FIG. 8, the color image processing apparatus 1B is identical in construction with the apparatus 1A of FIG. 6 except that an optimum color setting section 51 and a lightness conversion factor obtaining section 53 substitute for the optimum color setting section 8 and the lightness conversion factor obtaining section 10, respectively.

In the third embodiment, the functions of the optimum color setting section 51 and the lightness conversion factor obtaining section 53, like the first and second embodiments, are realized as a CPU of a computer system executes an application program (color image processing program).

The optimum color setting section 51 has a non-illustrated optimum color database similar to the optimum color database 8a (FIG. 4) of the first and second embodiments. In the optimum color database of the third embodiment, weighting factors (G) 52 are added to the optimum color database 8a as shown in FIG. 9.

Weighting factors 52 are relative factors G1 through Gn representing degrees of reliability of values of optimum colors 9-1 through 9-n; each weighting factor 52 indicates the extent to which the value of a previously prepared optimum color approximates the original color of the object.

Generally there exist many kinds in young leaves. Therefore dispersion of color values is great, so color values of optimum colors for young leaves are less reliable. On the contrary, the color values of a fair women are less uneven, so the color values of optimum colors for a fair women are much reliable. Consequently, a weighting factor for the color value of optimum color for young leaves is 1, and a weighting factor for the color value of optimum color for a fair women is 5.

The optimum color setting section 51 of the third embodiment, like the optimum color setting section 8 of the first and second embodiments, selects from the optimum color database a plurality of optimum colors 9-1 through 9-n to be paired respectively with a plurality of object colors 7-1 through 7-n designated by an object color designating section 6 and sets them as selected. As the result, a table of FIG. 10, which shows object colors and optimum colors and weighting factors in sets is created; the weighting factors 52 (G1 through Gn) correspond to the respective optimum colors 9-1 through 9-n.

And the lightness conversion factor obtaining section 53 obtains a lightness factor α based on the object color 7, the optimum color 9 and the weighting factor 52, and includes an individual lightness conversion factor obtaining section 54 and a lightness factor weighting averaging section 55.

The individual lightness conversion factor obtaining section 54 obtains a plurality of individual lightness conversion factors 58 (α1 through αn) each corresponding to the respective set of each object color 7-1 through 7-n and each optimum color 9-1 through 9-n.

In the meantime, the conversion factor weighting averaging section 55 reads from the optimum color database (table showing lightness-changed object colors and optimum colors and weighting factors in sets) weighting factors G1 through Gn corresponding to the respective optimum colors 9-1 through 9-n, and based on these weighting factors G1 through Gn, a weighting average value of a plurality of individual lightness conversion factors α1 through αn as the lightness conversion factor α.

In the color image processing apparatus 1B of the third embodiment, the procedure from inputting the color image 3 to designating the object colors 7-1 through 7-n takes place likewise in the apparatus 1 of the first embodiment.

And the optimum color setting section 51 sets the optimum colors 9-1 through 9-n to be paired with the respective object colors 7-1 through 7-n designated by the object color designating section 6, retrieves over the optimum color database containing weighting factors shown in FIG.9, creates the table of FIG. 10, which shows object colors and optimum colors and weighting factors in sets, and sends the created table to the lightness factor obtaining section 53.

The object colors 7-1 through 7-n and the optical colors 9-1 through 9-n to be paired with the respective object colors 7-1 through 7-n are sent to the individual lightness conversion factor obtaining section 54 where an individual lightness conversion factor 58 (α1 through αn) corresponding to each pair. The obtained individual lightness conversion factors 58 (α1 through αn) and the weighting factors 52 (G1 through Gn) are sent to the conversion factor weighting averaging section 55.

Using each of the weighting factors 52 (G1 through Gn), the conversion factor weighting averaging section 55 calculates a weighting average value of each individual lightness conversion factor 58 (α1 through αn) to obtain a lightness conversion factor 59 (α). For example, if four object colors 7-1 through 7-4 are set, the lightness conversion factor α(59) is calculated by the following formula (11):

$$\alpha = \frac{G_1 \cdot \alpha_1 + G_2 \cdot \alpha_2 + G_3 \cdot \alpha_3 + G_4 \cdot \alpha_4}{G_1 + G_2 + G_3 + G_4} \tag{11}$$

Subsequently, likewise in the second embodiment, conversion of lightness and conversion of hue and chroma are carried out over the lightness-changed color image by the lightness converting section 41 and the hue and chroma converting section 44, respectively, to create a color image 56 whose lightness, hue and chroma have been changed.

Figure 11:
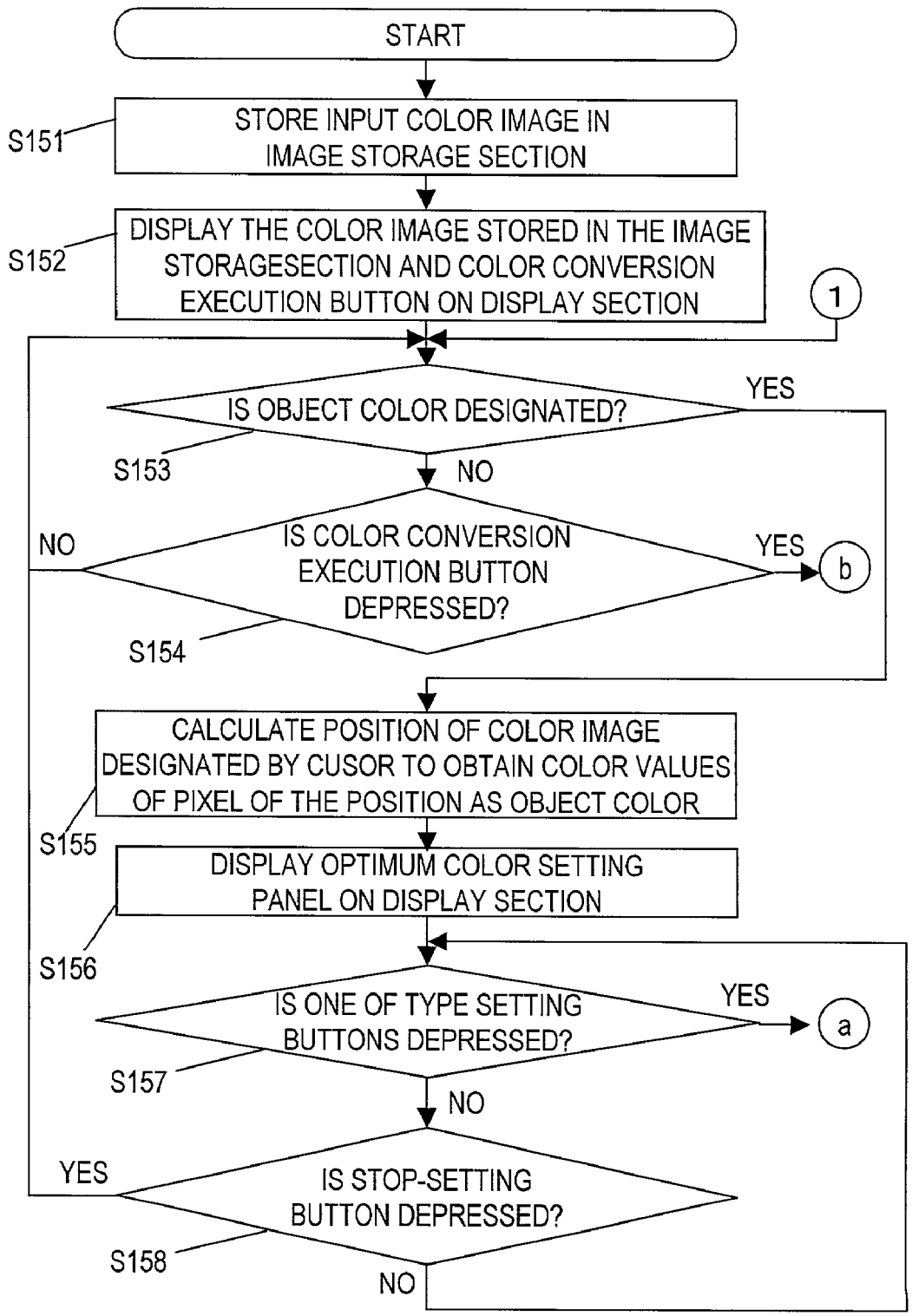
FIGS. 11 through 13 are flowcharts illustrating the operation of the apparatus of the third embodiment.
Figure 12:
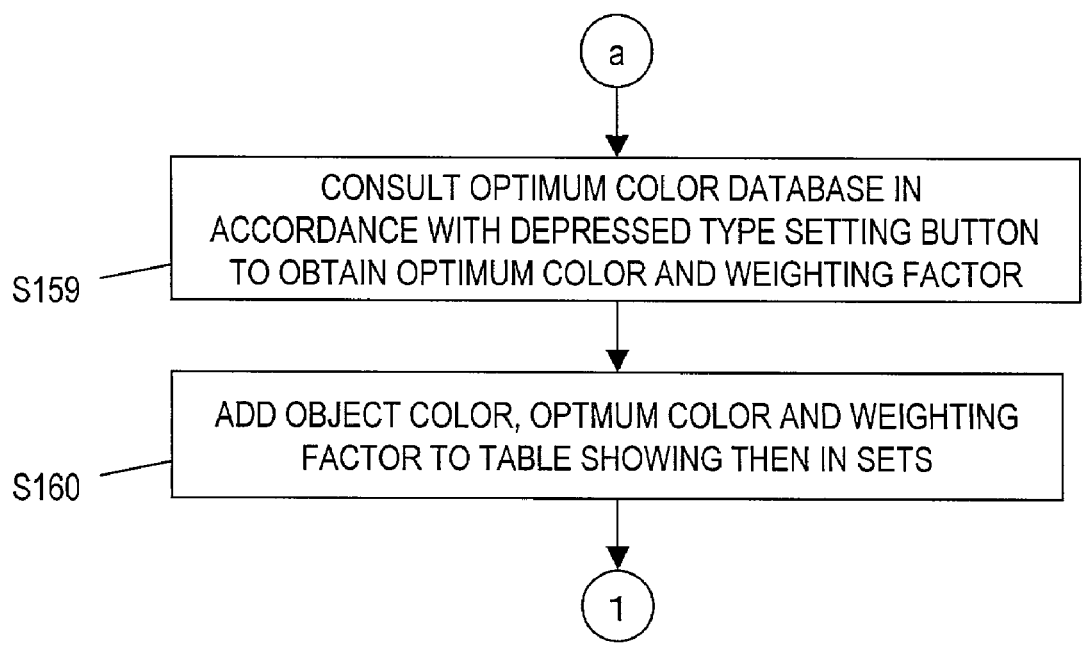
Figure 13:
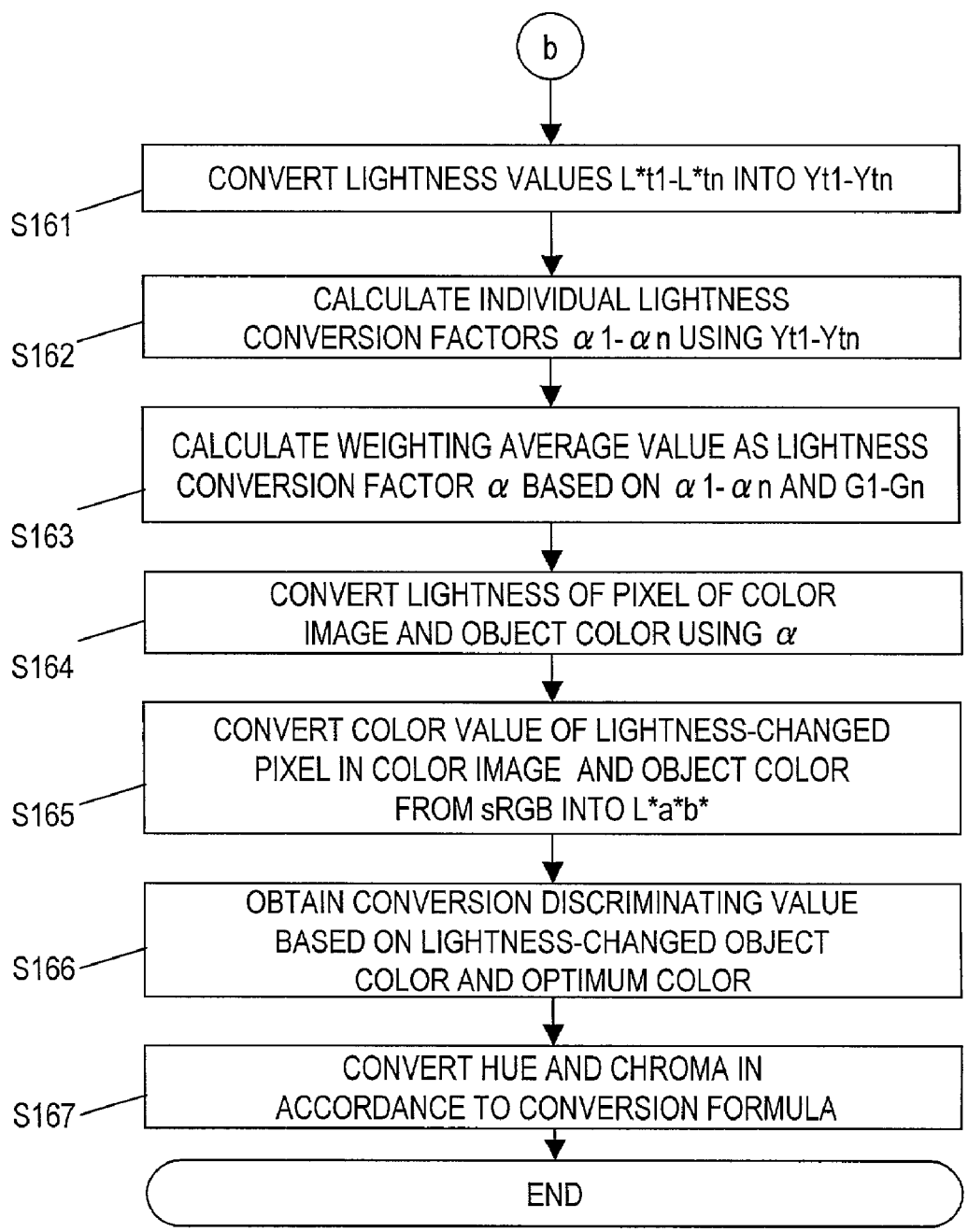
Figure 14:
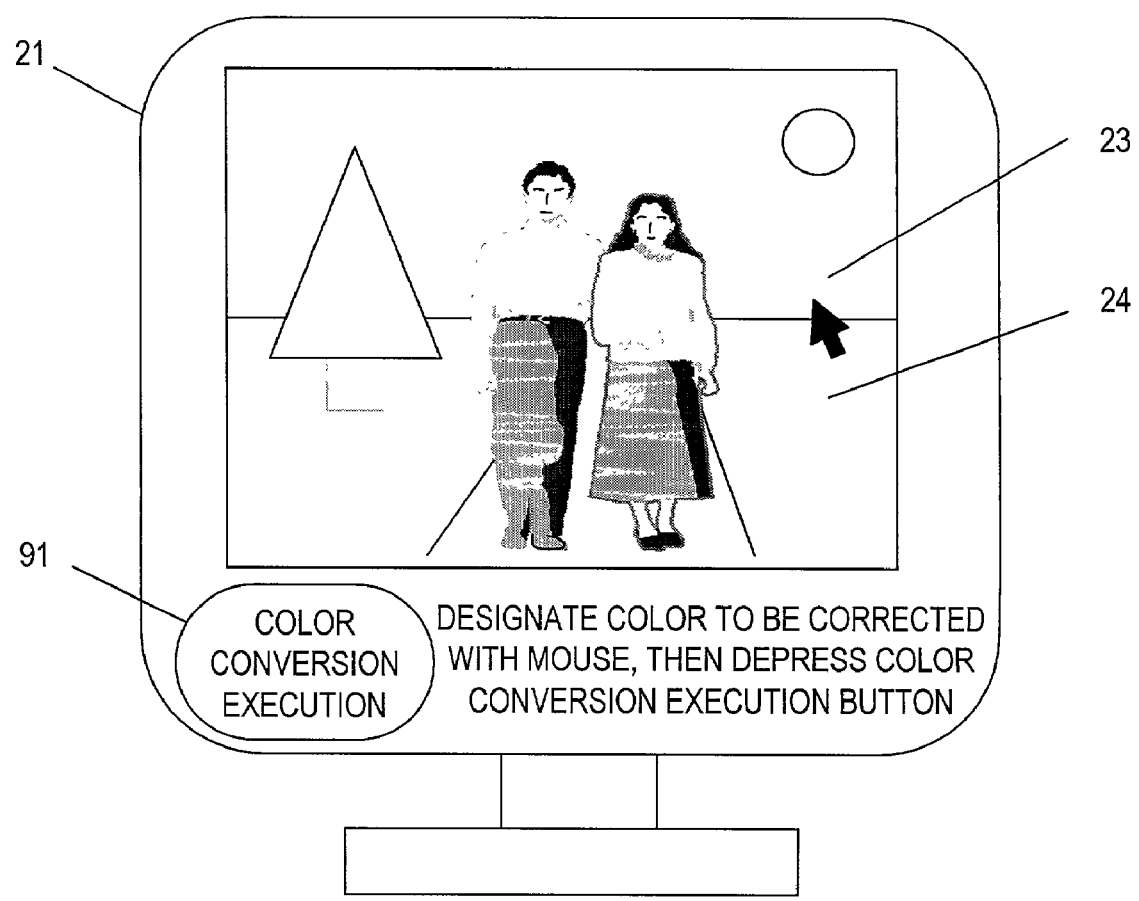
FIG. 14 is a diagram showing an exemplary display of a color conversion execution button in the apparatus of the third embodiment.

The operation of the color image processing apparatus 1B of the third embodiment will now be described with reference to FIGS. 2, 3, 9, and 11–14. FIGS. 11 through 13 are flowcharts (steps S151 through S167) in set illustrating the color image processing procedure of the third embodiment. FIG. 14 is a diagram showing an exemplary display of a color conversion execution button 91 in the apparatus 1B of the third embodiment.

Step S151: The input color image 3 (Ri, Gi, Bi) is stored in the image storage section 4.

Step S152: The color image 5 held in the image storage section 4 and the color conversion execution button 91 are displayed on the display section 21. The color conversion executing button 91 is displayed at a lower portion of the display section 21 as shown in FIG. 14.

Step S153: If the cursor 24 is located on the displayed color image 23 and then the mouse button 25 (FIG. 2) is depressed by the user, a pixel disposed at a tip of the cursor 24 is designated as the object color 7. If the designation is made (YES route of step S153), the procedure goes to step S155. Otherwise if no designation is made (NO route of step S153), the procedure goes to step S154.

Step S154: After the user has completed the designation of the object color 7, the color conversion executing button 91 is depressed (clicked) by operating the mouse 22. If the color conversion executing button 91 is depressed (YES route of step S154), the procedure goes to step S161 as shown in the flowchart of FIG. 13, and otherwise (NO route of step S154), the procedures returns to step S153.

Step S155: The position, which is designated by the cursor 24, of the color image 23 displayed on the display screen 21 is calculated to obtain color values (Rs, Gs, Bs) of the pixel of this position as the object color 7.

Step S156: The optimum color setting panel 31 shown in FIG.3 is displayed on the display section 21.

Step S157: If the type setting button 32 is depressed by the user (YES route of step S157), the procedure goes to step S159 of the flowchart "a" of FIG. 12, and otherwise (NO route of step 157), the procedure goes to step S158.

Step S158: If the stop-setting button 90 is depressed (YES route of step S158), designation of the object color 7 and setting of the optimum color 9 are stopped, and the procedure goes to step S153. Otherwise (NO route of step S158), the procedure goes to step S157.

Step S159: The optimum color database of FIG. 9 including the weighting factors is consulted in accordance with the depressed type setting button 32 to obtain an optimum color (L*t, a*t, B*t) and a weighting factor G.

Step S160: The object color (Rs, Gs, Bs), the optimum color (L*t, a*t, B*t) and the weighting factor G are added to the table as shown in FIG. 10, whereupon the procedure goes to step S153.

Upon completion of setting of the optimum color 9, the color conversion executing button 91 is depressed by the user (YES route of step S154), and then the procedure goes to step S161 of the flowchart "b" of FIG. 13.

If four types of object colors 7 are designated as shown in FIG. 2 (if n=4 in FIG. 13), Step S161: The lightness values L*t1 through L*t4 of the set four optimum colors are converted into Yt1 through Yt4 using the above formulas (1) through (4).

Step S162: The individual lightness conversion factors α1 through α4 satisfying the above equation (8) are calculated based on the above four sets of object colors and optimum colors.

Step S163: A weighting average value is calculated as a lightness conversion factor α by the above formula (1) based on the individual lightness conversion factors α1 through α4 and the corresponding weighting factors G1 through G4.

Step S164: Using the lightness factor α, conversion of lightness is carried out for color values of each pixel of the color image 5 and color values of the object color by the above formulas (5) through (7) to obtain color values (Rsp, Gsp, Bsp) of the lightness-changed color image 42 and color values (Rss, Gss, Bss) of the lightness-changed object color 43.

Step S165: The lightness-changed color image (Rsp, Gsp, Bsp) is further converted into color values (L*p, a*p, b*p) of L*a*b* space. Likewise, the color values (Rss1, Gss1, Bss1) through (Rss4, Gss4, Bss4) are converted into the color values (L*s1, a*s1, b*s1) through (L*s4, a*s4, b*s4) of L*a*b* space.

Step S166: Based on the color values (L*s1, a*s1, b*s1) through (L*s4, a*s4, b*s4) of four lightness-changed object colors and the color values (L*p, a*p, b*p), the conversion discriminating values D1 through D4 (formula (9))are obtained.

Step S167: In accordance to the above conversion formula (10) and D1 through D4, conversion of a* and b* of the lightness-changed color image (L*p, a*p, b*p), namely, conversion of hue and chroma is carried out.

According to the color image processing apparatus 1B of the third embodiment, simultaneously with the setting of the optimum colors 9 corresponding to the object colors 7 designated by the object color designating section 6, weighting factors G representing the degree of accuracy of the optimum colors 9 are set. Then in conversion of lightness, if there exist a plurality of sets of object colors 7 and optimum colors 9, a weighting average value of the individual lightness conversion factors α1 through αn is calculated to obtain a lightness conversion factor α with importance attached to the lightness of an optimum color whose weighting factor is large, thereby realizing precise correction of lightness.

Further, with weighting factors, which correspond to the individual optimum colors, being previously held in the optimum color database, the lightness conversion factor obtaining section 53 (conversion factor weighting averaging section 55) can calculate a weighting average value of the individual lightness conversion factors α1 through αn as the lightness conversion factor α with ease.

(4) FOURTH EMBODIMENT

Figure 15:
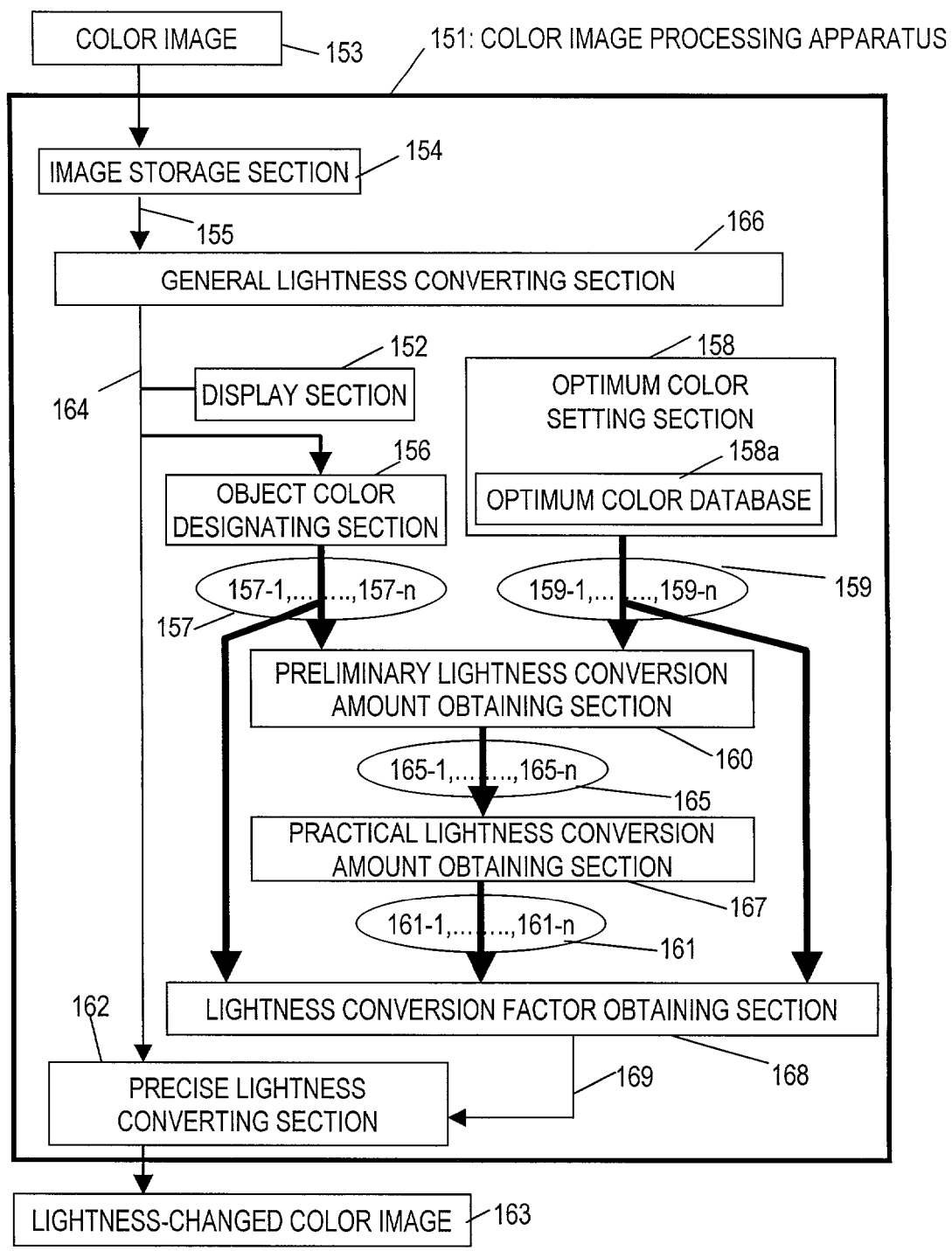
FIG. 15 is a block diagram showing a color image processing apparatus according to a fourth embodiment of the invention.

FIG. 15 is a block diagram showing a color image processing apparatus 151 according to a fourth embodiment of the invention. This apparatus 151 of the fourth embodiment performs correction of lightness over a color image input from a digital camera, an image scanner or the like, and comprises an image storage section 154, a general lightness converting section 166, a display section 152, an object color designating section 156, an optimum color setting section 158, a preliminary lightness conversion amount obtaining section 160, a practical lightness conversion amount obtaining section 167, a lightness conversion factor obtaining section 168, and a precise lightness converting section (lightness converting section) 162. The color image processing apparatus 151, like that of the first through third embodiments, is realized by a computer system (e.g., a personal computer).

The computer system realizing the color image processing apparatus 151 also is equipped with a non-illustrated CPU to which a memory (ROM, RAM, etc.) serving as the image storage section 154, a display (CRT, PDP, LCD, etc.) serving as the display section 152, and a mouse 22 (FIG. 2) are connected via a non-illustrated bus line.

The image storage section 154, the display section 152, the object color designating section 156 and the optimum color setting section 158 function likewise the image storage section 4, the display section 21, the object color designating section 6 and the optimum color setting section 8, respectively, so their detailed description is omitted here.

In the memory, a color image processing program for realizing the general lightness converting section 166, the object color designating section 156, the optimum color setting section 158, the preliminary lightness conversion amount obtaining section 160, the practical lightness conversion amount obtaining section 167, the lightness conversion factor obtaining section 168 and the precise lightness converting section 162, all shown in FIG. 15, is stored as an application program.

As the CPU reads out this color image processing program from the memory via the bus line and executes it, the respective functions (described later in detail) of the general lightness converting section 166, the object color designating section 156, the optimum color setting section 158, the preliminary lightness conversion amount obtaining section 160, the practical lightness conversion amount obtaining section 167, the lightness conversion factor obtaining section 168 and the precise lightness converting section 162, namely, the function of the color image processing apparatus 151 of the fourth embodiment is realized, executing the color image processing method of the invention.

The color image program stored in an internal storage device (the memory in this embodiment) is executed by a microprocessor (the CPU in this embodiment) of a computer. Alternatively, the computer system may read the color image processing program directly from a recording medium to execute the program.

The color image processing program of the fourth embodiment includes program codes for instructing the above-mentioned computer to function as the general lightness converting section 166, the object color designating section 156, the optimum color setting section 158, the preliminary lightness conversion amount obtaining section 160, the practical lightness conversion amount obtaining section 167, the lightness conversion factor obtaining section 168 and the precise lightness converting section 162. Alternatively part of these functions may be realized by an operation system rather than a color image processing program (application program).

Various functions (the functions of the general lightness converting section 166, the object color designating section 156, the optimum color setting section 158, the preliminary lightness conversion amount obtaining section 160, the practical lightness conversion amount obtaining section 167, the lightness conversion factor obtaining section 168 and the precise lightness converting section 162) to be realized by the CPU will now be described in detail.

Also in the fourth embodiment, a color image 153 from an image input device, such as a digital camera or an image scanner, is sent to and stored in the image storage section 154 mounted in the color image processing section 151. Alternatively, such color image 153 may be stored in an external storage device connected to the color image processing apparatus 151. In correction of a color image by the user, a preliminary lightness-changed color image 164 obtained by the general lightness converting section 166 is sent to the display section 152 for being displayed thereon as shown in FIG. 2.

The general lightness converting section 166 previously converts the lightness of a color image 155 based on the distribution(histogram) of pixel information (brightness, lightness, density) of the color image 155, namely, the maximum/minimum/average values of the pixel information of the color image 155 to thereby create a preliminary conversion-changed color image 164.

This general lightness converting section 166 should by no means be limited to a lightness converting section having a particular algorithm and may be any other lightness converting section that can perform general lightness conversion of a color image.

For example, the general lightness converting section 166 may be exemplified by the above-mentioned Prior Art Reference 1 and Juha Katajamäki and Pekka Laihanen, "Image Dependent Gamma Selection Based on Color Palette Equalization and a Simple Lightness Model", Proc. Of $7^{th}$ CIC 301–306 (1999)".

In the last-named technology, the lightness of the input color image is optimized in the following procedure (e1) through (e3):

(e1) A pallet image in which very many colors of a color image are reduced to several to several tens of colors in accordance with the degree of color approximation. The distribution of lightness of the color contained in this pallet image (pallet image before gamma conversion) is shown in FIG. 16A.

Figure 16A:
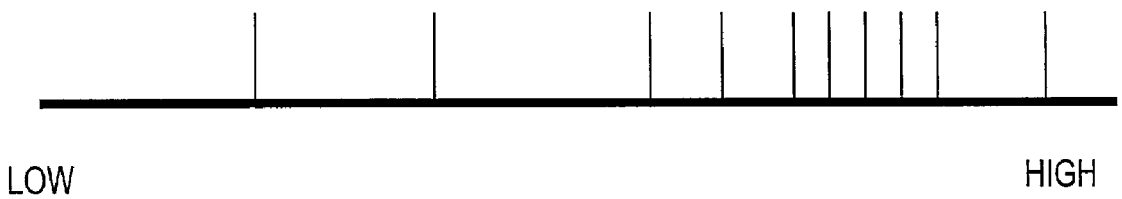
FIGS. 16A and 16B are diagrams illustrating a lightness correction technique (equalizing in lightness of color in a pallet image) using a general lightness converting section in the apparatus of the fourth embodiment.
Figure 16B:
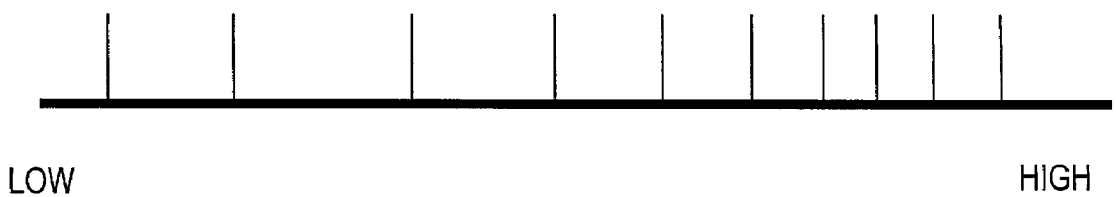

(e2) Gamma factor values are calculated which can convert a color image in such a manner that lightness values of colors in a pallet image are arranged at substantially uniform distances as shown in FIG. 16B.

(e3) Using the gamma factor values calculated in (e2), conversion is made over the original color image to be converted.

FIGS. 16A and 16B are diagrams illustrating a lightness correction technique (equalizing in lightness of color in a pallet image) using a general lightness converting section 166 in the apparatus 151 of the fourth embodiment.

The object designating section 156 is identical in function with the object color designating section 6 of the first embodiment and obtains one or more object colors 157 (157-1 through 157-n).

The optimum color setting section 158 has an optimum color database 158a similar to the optimum color database 8a of the first embodiment and is identical in function with the optimum color setting section 8 of the first embodiment. The optimum color setting section 158 selects from the optimum color database 158a one or more optimum colors 159 (159-1 through 159-n) corresponding to one or more object colors 157 (157-1 through 157-n) designated by the object color designating section 156 and sets them as selected.

Alternatively, designation of the object color(s) 157 may be carried out by automatically retrieving over the color image 155. Also, setting of the optimum color(s) 159 may be carried out by automatically discriminating without designating by the user.

The preliminary lightness conversion amount obtaining section 160 obtains an absolute value of difference in lightness between the object colors 157 (157-1 through 157-n) and the optimum colors 159 (159-1 through 159-n), which are to be respectively paired therewith, for every pair as a preliminary lightness conversion amount 165 (165-1 through 165-n).

The practical lightness conversion amount obtaining section 167 converts the preliminary lightness conversion amount 165 in accordance with the largeness of the preliminary lightness conversion amount 165 (165-1 through 165-n) so as to decrease the largeness of the preliminary lightness conversion amount 165 to obtain a practical lightness conversion amount 161 (161-1 through 161-n). At that time, therefore, the practical lightness conversion amount obtaining section 167 obtains a practical lightness conversion amount 161 such as to approximate a constant value as the largeness of the preliminary lightness conversion amount 165 increases.

The lightness conversion factor obtaining section 168 obtains a lightness conversion factor 169 based on the practical lightness conversion amount 161 (161-1 through 161-n), the object color 157 (157-1 through 157-n) and the optimum color 159 (159-1 through 159-n).

Using the lightness conversion factor 169, the precise lightness converting section (lightness converting section) 162 converts the lightness of the preliminary lightness-changed color image 164 previously converted by the general lightness converting section 166 to obtain a lightness-changed color image 163.

The operation of the color image processing apparatus 151 of the fourth embodiment will now be described with reference to FIG. 17.

First of all, the general lightness converting section 166 performs general lightness conversion (such as lightness conversion by the conventional technique) for the color image 155 (Ri, Gi, Bi) stored in the image storage section 154.

The general lightness converting section 166 performs conversion of lightness (ordinary lightness conversion exemplified by Prior Art Reference 1 and the technology described in connection with FIGS. 16A and 16B) using color distribution (histogram), or average/maximum values, of an image without converting by the method having a particular algorithm.

By this general lightness converting section 166, the color image 155 is converted into a preliminary lightness-changed color image 164 (Rii, Gii, Bii). This preliminary lightness-changed color image 164 is displayed on the display section 152 as the displayed image 23, as shown in FIG. 2.

Then, in the object color designating section 156, the object color(s) 157 (157-1 through 157-n) are designated by the same method as that of the first embodiment. The object color(s) 157 (157-1 through 157-n) obtained by the object color designating section 156 are extracted from the preliminary lightness-changed color image 164 (Rii, Gii, Bii) unlike the first embodiment in which they are extracted from the color image 155 (Ri, gi, Bi).

In the optimum color setting section 158, the optimum color(s) 159 (159-1 through 159-n) are selected from the optimum color database 158a and set, so that a table showing object colors and optimum colors in pairs is created likewise in the first embodiment as shown in FIG. 5.

Consulting the table of FIG. 5, the preliminary lightness conversion amount obtaining section 160 calculates a preliminary lightness conversion amount ΔPt (165, 165-1 through 165-n) for every set of object color 157 and optimum color 159.

By the above formulas (1) through (4), the object color(s) 157 (Rs, Gs, Bs) are converted into values (L*s, a*s, b*s) of L*a*b* space, and a preliminary lightness conversion amount ΔPt is calculated as an absolute value of difference between L*s of the object color 157 and L*t of the corresponding optimum color 159 (L*t, a*t, b*t).

Then, in the practical lightness conversion amount obtaining section 167, the preliminary lightness conversion amount ΔPt is decreased, and the practical lightness conversion amount ΔP (161, 161-1 through 161-n) is obtained by the following formulas (12) and (13). A constant LIM in the formulas (12) and (13) represents a maximum value the practical lightness conversion amount ΔP can assume by the formulas (12) and (13); experiments indicates that the best result is approximately 30. FIG. 17 shows a relation between the preliminary lightness conversion amount ΔPt and the practical lightness conversion amount ΔP calculated by the formulas (12) and (13).

$$\text{if } \Delta P_t > (2 \cdot LIM), \text{ then } \Delta P = LIM \tag{12}$$

otherwise, then $$\Delta P = \Delta P_t - \frac{1}{4 \cdot LIM}(\Delta P_t)^2 \tag{13}$$

where LIM=30

Thus, in the practical lightness conversion amount obtaining section 167, if the preliminary lightness conversion amount ΔPt is small, the value of the preliminary lightness conversion amount ΔPt is obtained with no change as a practical lightness conversion amount ΔP. The practical lightness conversion amount ΔP is calculated so as to approximate a constant LIM (=30) as the preliminary lightness conversion amount ΔPt is increased; if the preliminary lightness amount ΔPt exceeds a constant 2·LIM, a practical lightness conversion amount ΔP is a constant LIM (e.g., 30).

Subsequently, in the lightness conversion factor obtaining section 168, a lightness conversion factor α, which is a factor to be used for conversion of lightness by the precise lightness converting section 162, is obtained.

At that time, using values (L*s, a*s, b*s) in L*a*b* space of the object color(s) 157, the values (L*t, a*t, b*t) of each optimum color 159 and the practical lightness conversion amount (ΔP) 161 to be paired therewith, conversion of L*t value of each optical color 159 is made by the following formulas (14) and (15), obtaining an after-conversion value L*tt.

$$\text{If } L^*_t > L^*_s, \text{ then } L^*_{tt} = L^*_s + \Delta P \tag{14}$$

$$\text{otherwise, then } L^*_{tt} = L^*_s - \Delta P \tag{15}$$

Further, in the lightness conversion factor obtaining section 168, using each optimum color 159 (L*tt, a*t, b*t), which are converted by the formulas (14) and (15), and the object color 157, a lightness conversion factor α is obtained in the same method as that of the lightness conversion factor obtaining section 10 of the first embodiment.

At that time, the practical lightness conversion amount ΔP is limited to a maximum value (LIM) and does not exceed the preliminary lightness conversion amount ΔPt, which is an absolute value of difference between the object color 157 and the optimum color 159. Accordingly, by the equations (14) and (15), in the lightness conversion factor obtaining section 168, the absolute value of conversion amount of lightness of the color image to be converted using the lightness conversion factor α is limited to a particular value.

Finally, in the precise lightness converting section 162, using a lightness conversion factor α obtained by the lightness conversion factor obtaining section 168, precise lightness conversion over the preliminary lightness-changed image 164 (Rii, Gii, Bii) is carried out to create a lightness-changed color image 163. The conversion method at that time is similar to that of the lightness converting section 12 of the first embodiment except that the object to be converted is the preliminary lightness-changed image 164 (Rii, Gii, Bii)

According to the color image processing apparatus 151 of the fourth embodiment, as exemplified by Prior Art Reference 1 and the technology described in connection with FIGS. 16A and 16B, the general lightness converting section 166 performs general conversion of lightness of the color image 155 to create a preliminary lightness-changed image 164. Since this preliminary lightness-changed image 164 has not been processed by lightness conversion by the technique of matching the lightness of the memorized color with that of the optimum value, the memorized color of the image 164 has a somehow improved but not optimal lightness.

For this preliminary lightness-changed image 164, the object color 157 and the optimum color 159 to be paired therewith are obtained by the object color designating section 156 and the optimum color setting section 158, respectively. As a result, a preliminary lightness conversion amount (ΔPt) 165, which is an absolute value of difference in lightness between the object color 157 and the optimum color 159, is obtained.

Since the preliminary lightness-changed image 164 has been somehow processed with lightness conversion, the preliminary lightness conversion amount 165 usually does not become so large. But if the image is an against-the-light image, such value would be large.

In such against-the-light image, as mentioned above, the intermediate lightness between the against-the-light area and the non-against-the-light area is optimal. However, even though either the conventional method or the method of the first through third embodiments is used, it is impossible to convert the lightness of the against-the-light image into the above-mentioned optimum lightness.

Consequently, in the color image processing apparatus 151 of the fourth embodiment, the practical lightness conversion amount obtaining section 167 performs conversion such as to decrease the value of the preliminary lightness conversion amount (ΔPt) 165 as the preliminary lightness conversion amount (ΔPt) 165 increases, thereby obtaining a practical lightness conversion amount (ΔP) 161.

Specifically, if the preliminary lightness conversion amount (ΔPt) 165 is small, the image is judged as a non-against-the-light image, and a value such as to match the object color 157 with the optimum lightness is set as a practical lightness conversion amount ΔP. Otherwise if the preliminary lightness conversion amount (ΔPt) 165 is large, the value of this preliminary lightness conversion amount (ΔPt) 165 is decreased to obtain a practical lightness conversion amount (ΔP)161. Thus optimization of lightness of the object color 157 and optimum lightness conversion (moderate lightness conversion) take place.

Thus, according to the color image processing apparatus 151 of the fourth embodiment, since the preliminary lightness conversion amount (ΔPt) 165 is converted so as to decrease it depending on the largeness of the preliminary lightness conversion amount (ΔPt) 165 and is used as a practical lightness conversion amount (ΔP) 161, it is possible to realize optimization of lightness of the object color for an against-the-light image and optimum lightness conversion (moderate lightness conversion) for the whole image. Therefore, a characteristic color of the object (particularly a skin color of a person) is converted into a better lightness than the original image without considerably changing the lightness of the whole against-the-light image, and as a result, an against-the-light image can be converted into an apparently natural image.

Figure 17:
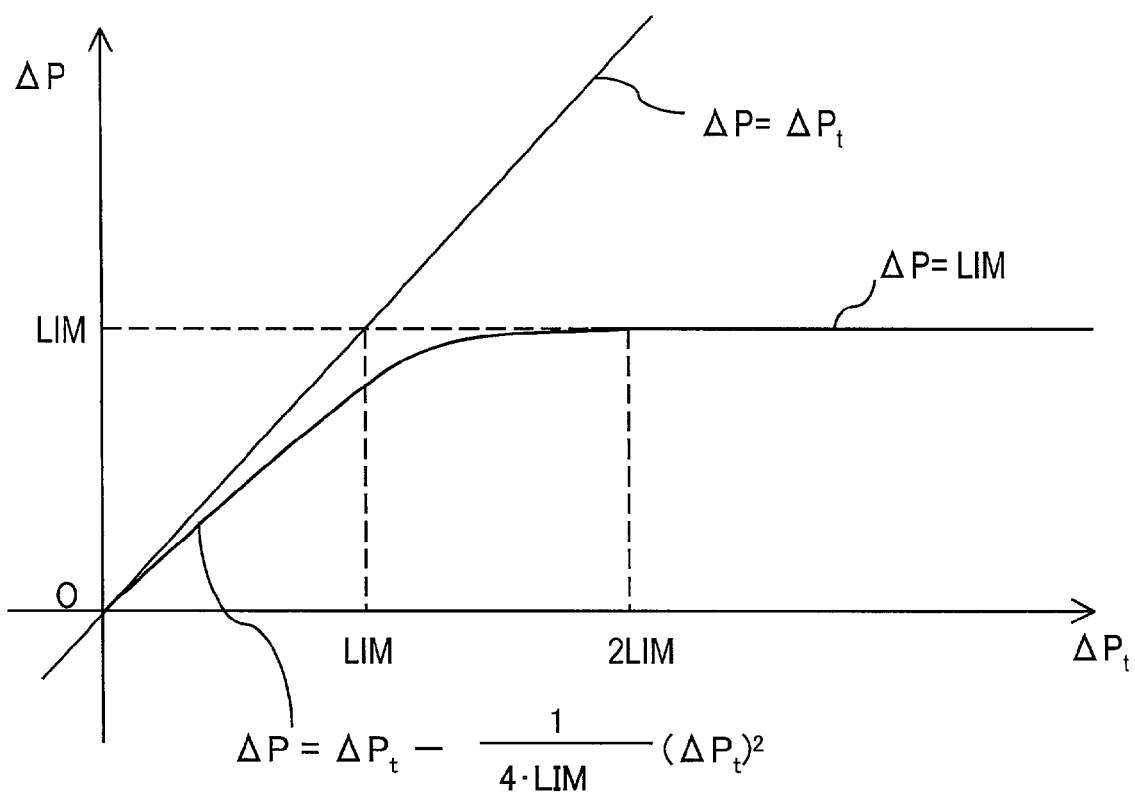
FIG. 17 is a graph illustrating the operation of a practical lightness conversion amount obtaining section of the apparatus of the fourth embodiment.
Figure 18:
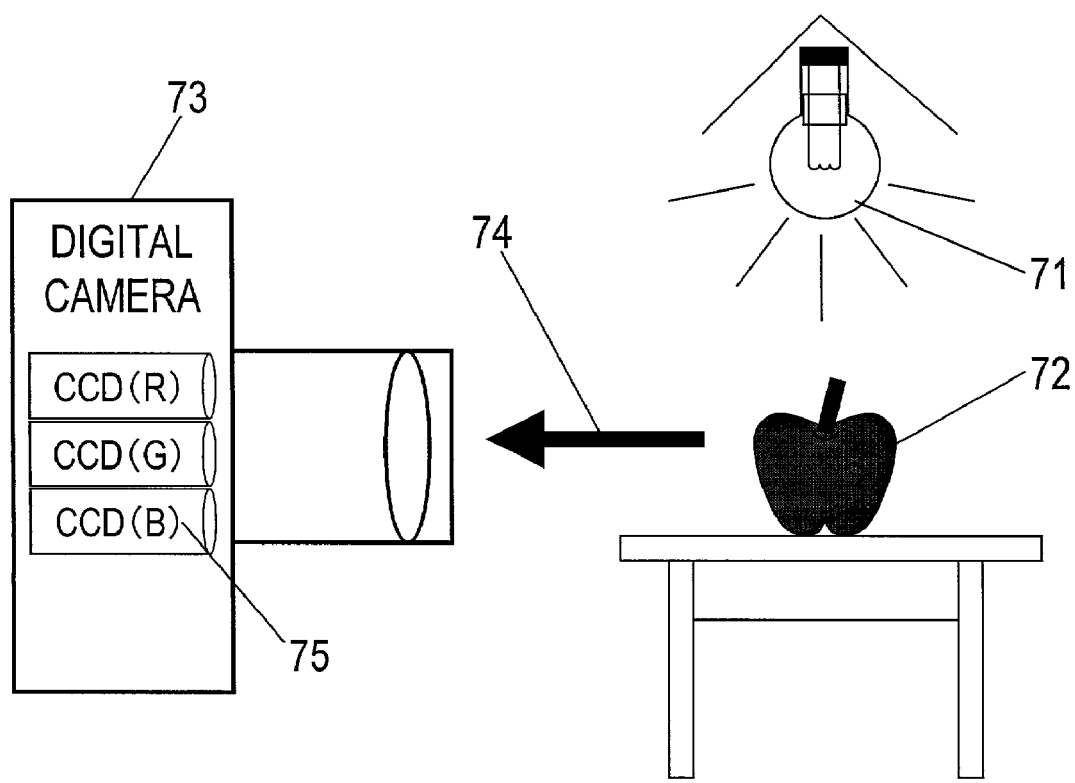
FIG. 18 is a diagram illustrating a situation in which an image of an object is taken under proper light.
Figure 19:
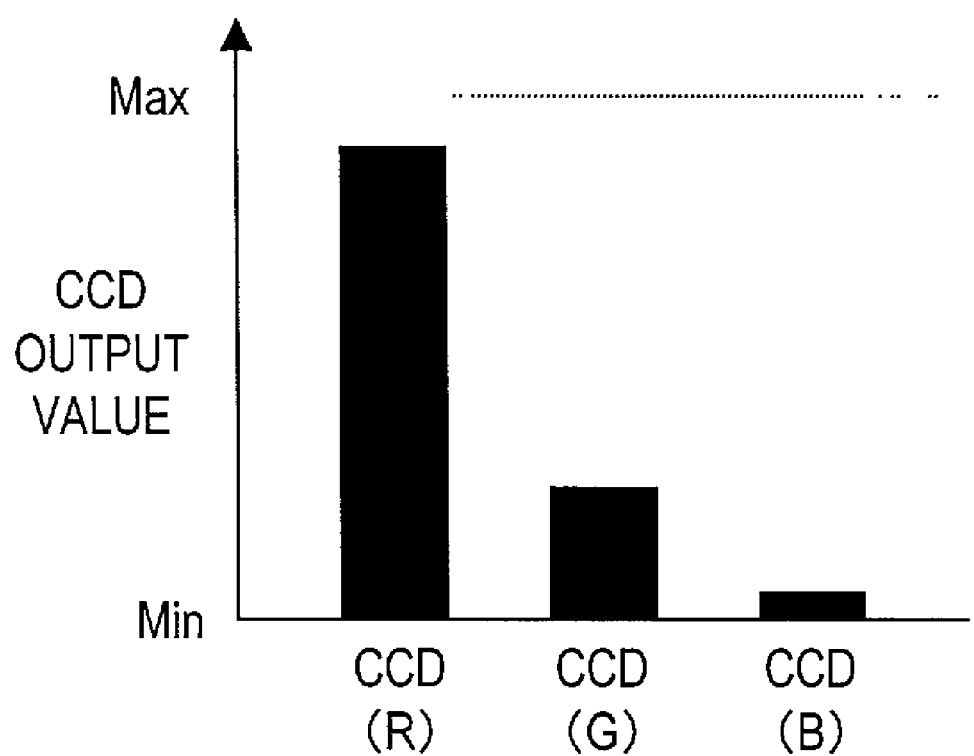
FIG. 19 is a graph showing output values of Red, Green and Blue CCDs under proper exposure.
Figure 20:
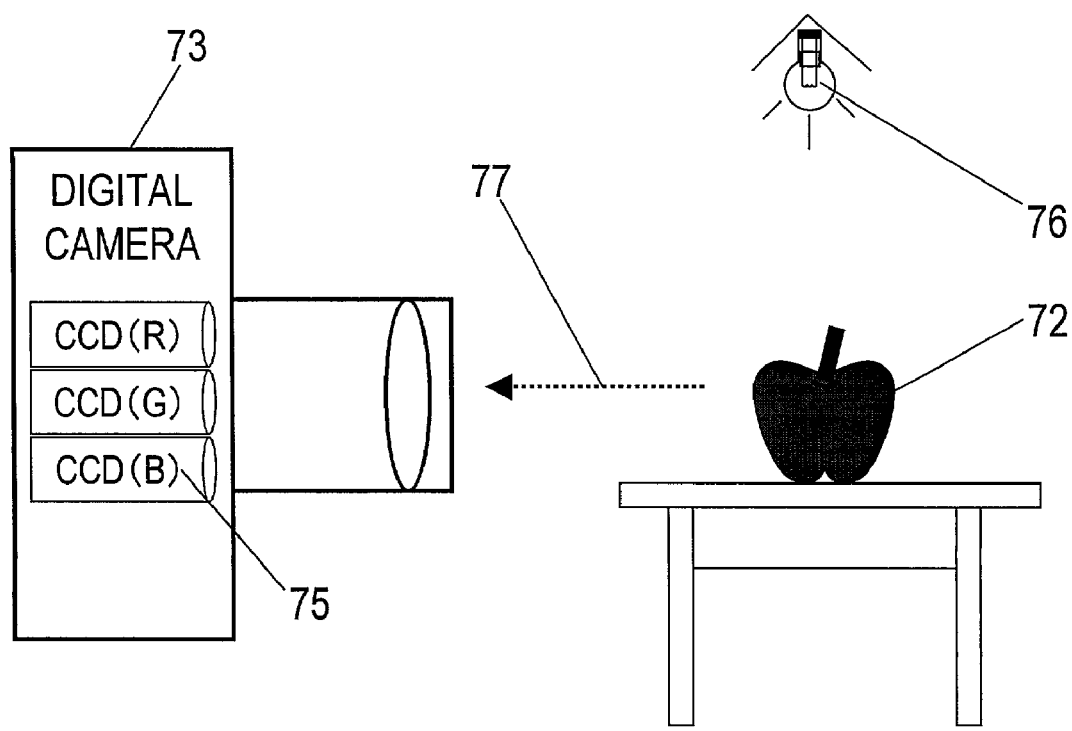
FIG. 20 is a diagram illustrating a situation in which an image of an object is taken under dark light.
Figure 21:
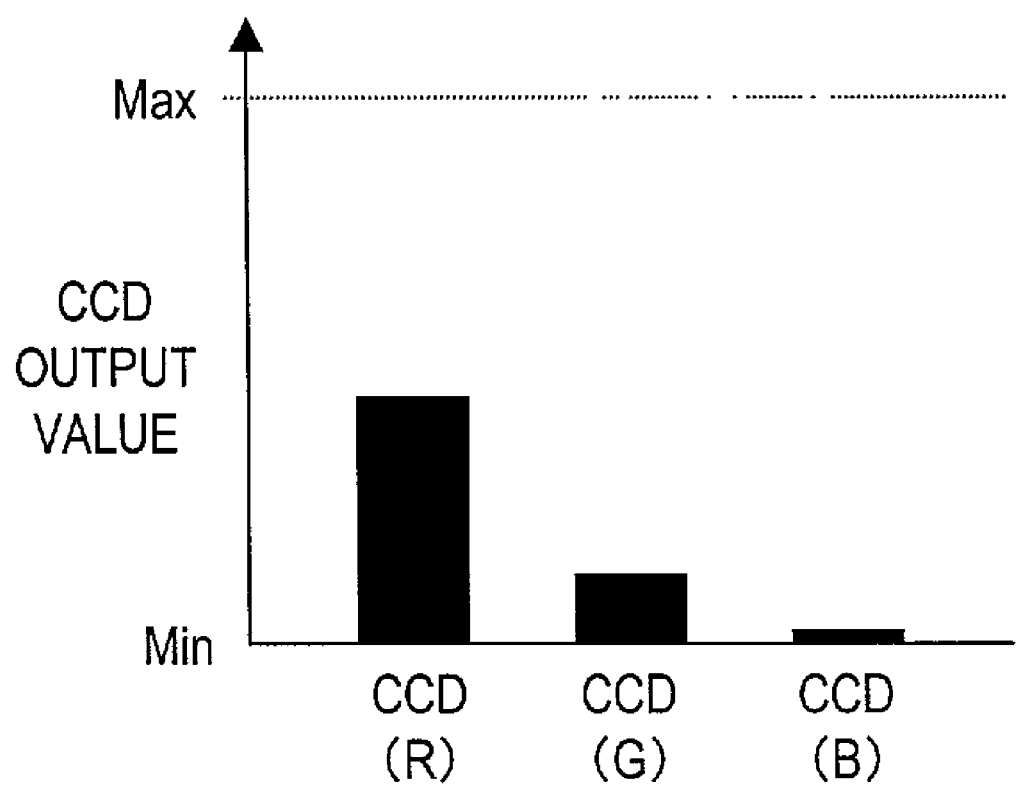
FIG. 21 is a graph showing output values of Red, Green and Blue CCDs under inadequate exposure.
Figure 22:
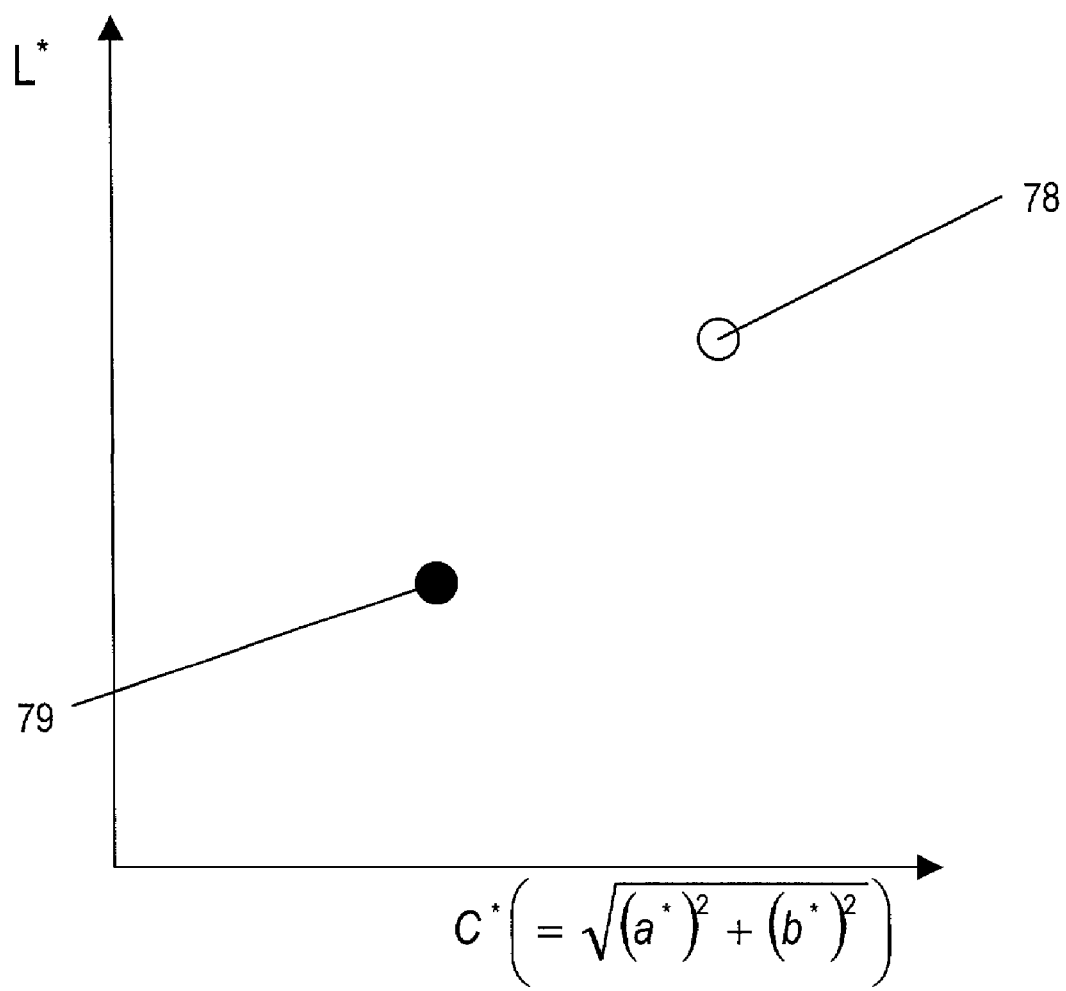
FIG. 22 is a graph showing a relation of the color value of the CCD output under proper exposure and that under inadequate exposure in L*C* notation.
Figure 23:
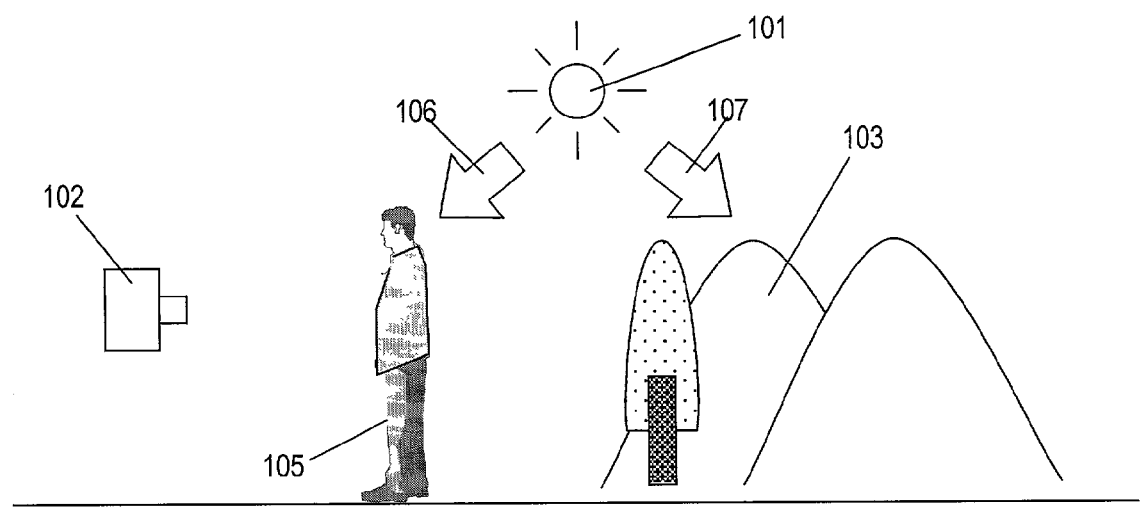
FIG. 23 is a diagram illustrating a situation in which an image of an object is taken against the light.
Figure 24:
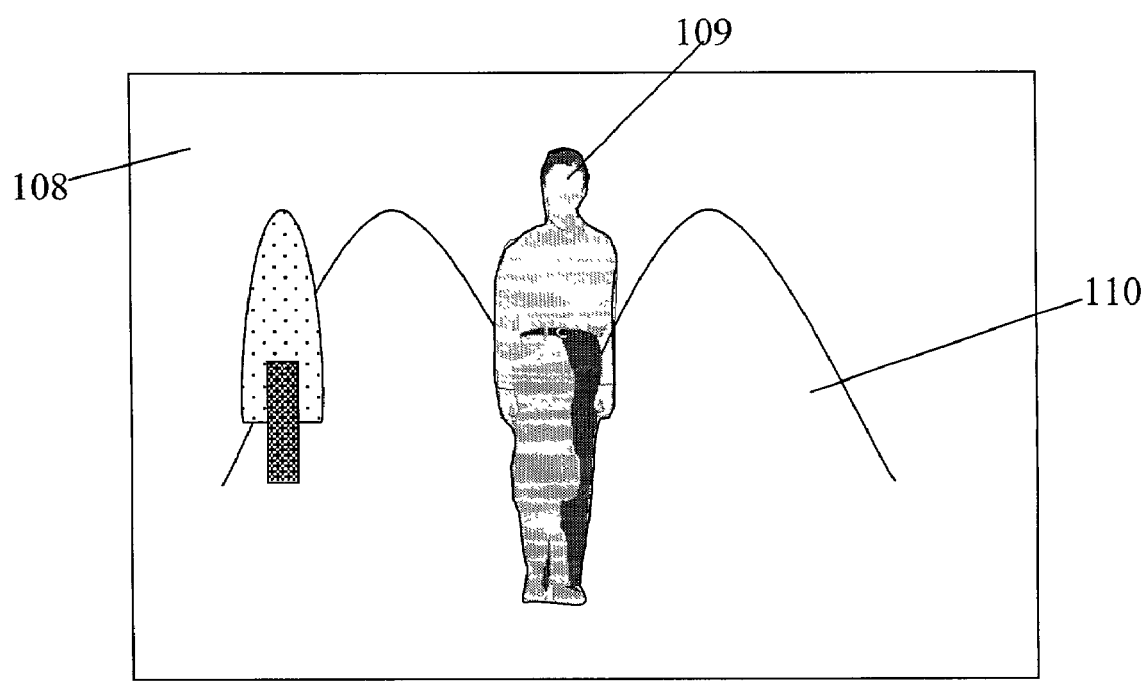
FIG. 24 is a diagram showing an exemplary picture taken against the light.
Figure 25A:
FIG. 25A is a histogram of lightness of a night-view image, whose density average value is originally high.
Figure 25B:
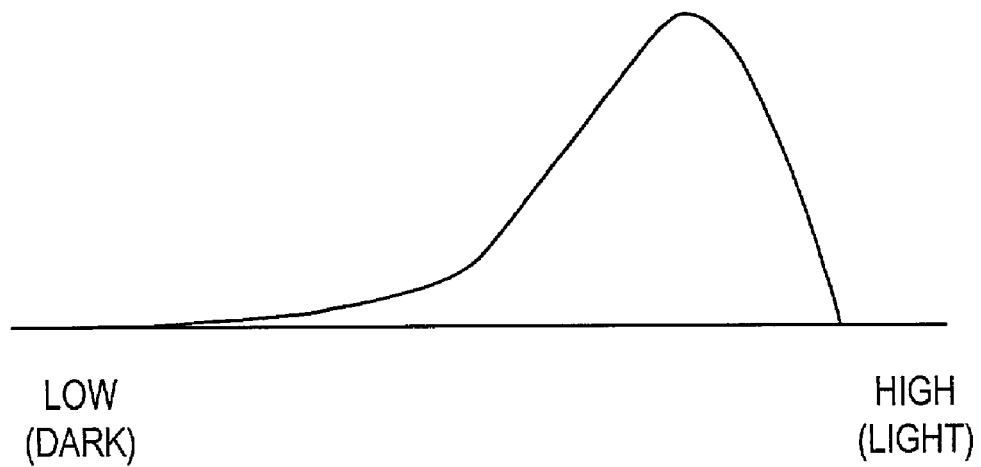
FIG. 25B is a histogram of lightness of a snow-covered-mountain-view image, whose density average value is originally low.
Figure 25C:
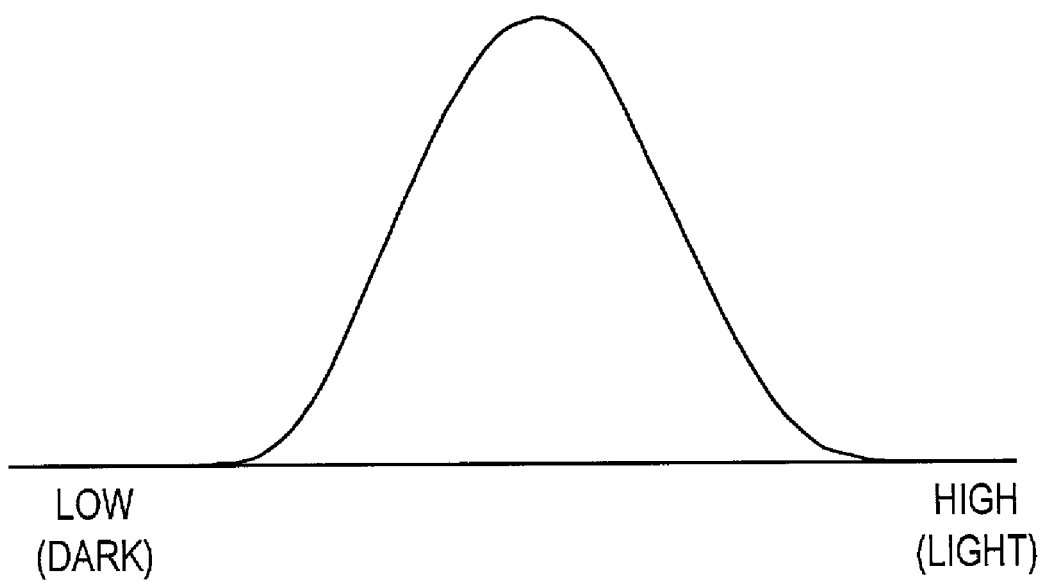
FIG. 25C is a histogram of lightness of an image as corrected by Prior Art Reference 1.
Figure 26:
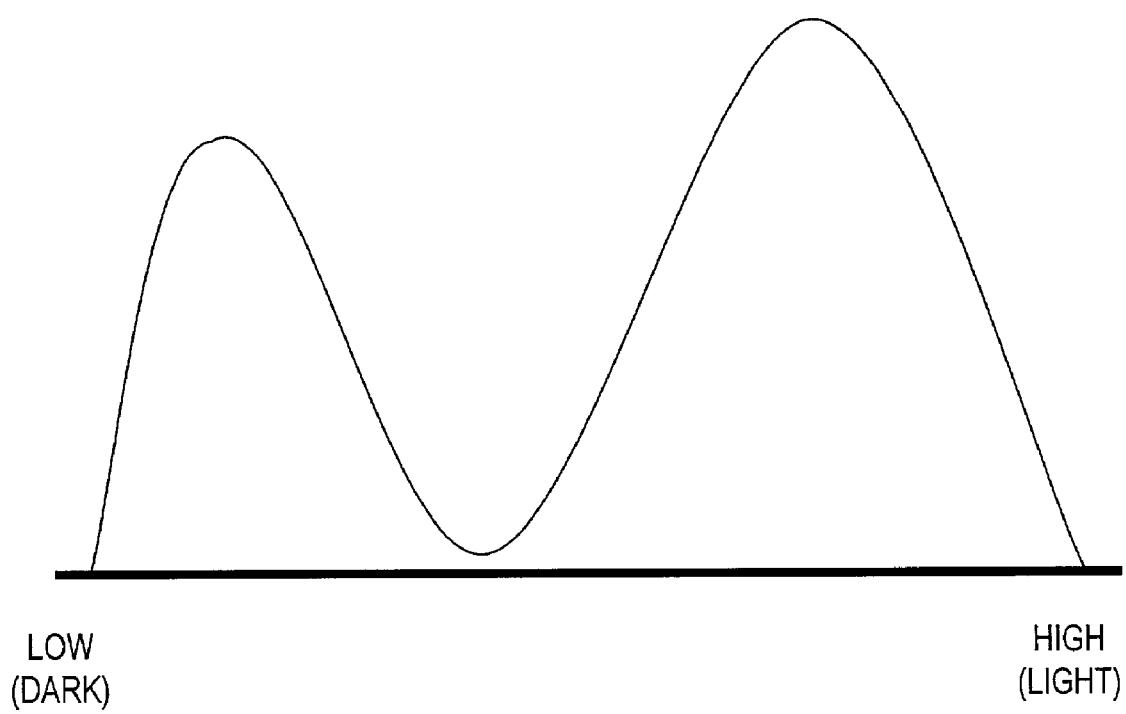
FIG. 26 is a histogram of lightness of an against-the-light image.

Particularly in the practical lightness conversion amount obtaining section 167 of the fourth embodiment, as shown in FIG. 17, if the preliminary lightness conversion amount (ΔPt) 165 is small, the value of the preliminary lightness conversion amount (ΔPt) 165 is set with no change as a practical lightness conversion amount (ΔP) 161. And this preliminary lightness conversion amount (ΔPt) 165 is converted so as to decrease as the largeness of the preliminary lightness conversion amount (ΔPt) 165 increases, thereby obtaining a practical lightness conversion amount (ΔP) 161.

At that time, the value of a practical lightness conversion amount (ΔP) 161 is determined so as to approximate a constant value LIM (e.g., 30). Therefore, even if the preliminary lightness conversion amount (ΔPt) 165 is remarkably large hue to a severe-against-the-light image, the maximum conversion amount is limited to a constant value LIM so that intended lightness conversion can be performed without impairing the balance of lightness of the whole image.

Further, because, before formal lightness conversion by the precise lightness converting section 162, by the general lightness converting section 166, general lightness conversion for the color image 155 is carried out based on distribution (histogram) of pixel information (brightness, lightness, density) of the color image 155 or maximum/minimum/average values of pixel information (brightness, lightness, density) of the color image 155, the preliminary lightness-changed color image 164 before precise lightness conversion is guaranteed to be nearly optimal in lightness. Accordingly, even though this preliminary lightness-changed color image 164 is processed with formal lightness conversion by the precise lightness converting section 162 to make fine adjustment of lightness so as to improve the memorized color, it is possible to keep the lightness of the whole image almost optimal.

Alternatively, the color image processing apparatus 151 of the fourth embodiment may be equipped with the hue and chroma converting section 44 (FIG. 6) of the second embodiment and/or the lightness conversion factor obtaining section 53 (FIG. 8) of the third embodiment. With this alternative arrangement, it is possible to achieve the same results as those of the second and third embodiments.

In another alternative, the color image processing apparatus 151 of the fourth embodiment may be devoid of the general lightness converting section 166. Also in this second alternative form, like the fourth embodiment, an against-the-light image almost can be recognized, and optimization of lightness of the object color 157 for the against-the-light image and preservation of entire lightness of the original color image can be realized. It is therefore possible to convert a characteristic color of the object into a better lightness than the original image without considerably changing the lightness of the whole against-the-light image so that the against-the-light image can be converted into an apparently natural image.

(5) OTHER MODIFICATIONS

The present invention should by no means be limited to the foregoing illustrated embodiments, and various changes and modifications may be suggested without departing from the gist of the invention.

What is claimed is:

1. A color image processing apparatus comprising:
 object color designating means for designating an object color to be converted in an input color image;
 optimum color setting means for setting an optimum color corresponding to said object color designated by said object color designating means;
 preliminary lightness conversion amount obtaining means for obtaining a preliminary lightness conversion amount in accordance with a differential value in lightness between said object color and said optimum color;
 practical lightness conversion amount obtaining means for obtaining a practical lightness conversion amount by compensating said preliminary lightness conversion amount so as to decrease said preliminary lightness conversion amount commensurate with the largeness of said preliminary lightness conversion amount;
 lightness conversion factor obtaining means for obtaining a lightness conversion factor based on said practical lightness conversion amount, said object color and said optimum color; and
 lightness converting means for converting the input color image in lightness using said lightness conversion factor to create a lightness-changed color image.

2. A color image processing apparatus according to claim 1, wherein said practical lightness conversion amount obtaining means obtains said lightness conversion amount such as to approximate a predetermined value as said preliminary lightness conversion amount increases.

3. A color image processing apparatus according to claim 1, further comprising preliminary lightness converting means for preliminarily converting the input color image in lightness, based on a histogram or a maximum/minimum/average value of pixel information in the input color image, to create a preliminary amended-lightness color image as the color image.

4. A color image processing apparatus according to claim 2, further comprising preliminary lightness converting means for preliminarily converting the input color image in lightness, based on a histogram or a maximum/minimum/average value of pixel information in the input color image, to create a preliminary amended-lightness color image as the color image.

5. A computer-readable recording medium in which a color image processing program is recorded, wherein said color image processing program instructs a computer to function as the following:
 object color designating means for designating an object color to be converted in an input color image;
 optimum color setting means for setting an optimum color corresponding to said object color designated by said object color designating means;
 preliminary lightness conversion amount obtaining means for obtaining a preliminary lightness conversion amount in accordance with a differential value in lightness between said object color and said optimum color;

practical lightness conversion amount obtaining means for obtaining a practical lightness conversion amount by compensating said preliminary lightness conversion amount so as to decrease said preliminary lightness conversion amount commensurate with the largeness of said preliminary lightness conversion amount;

lightness conversion factor obtaining means for obtaining a lightness conversion factor based on said practical lightness conversion amount, said object color and said optimum color; and lightness converting means for converting the input color image in lightness using said lightness conversion factor to create a lightness-changed color image.

6. A computer-readable recording medium according to claim 5, wherein said practical lightness conversion amount obtaining means obtains said lightness conversion amount such as to approximate a predetermined value as said preliminary lightness conversion amount increases.

7. A computer-readable recording medium according to claim 5, wherein said color processing program further instructs the computer to function as preliminary lightness converting means for preliminarily converting the input color image in lightness, based on a histogram or a maximum/minimum/average value of pixel information in the input color image, to create a preliminary amended-lightness color image as the color image.

8. A computer-readable recording medium according to claim 6, wherein said color processing program further instructs the computer to function as preliminary lightness converting means for preliminarily converting the input color image in lightness, based on a histogram or a maximum/minimum/average value of pixel information in the input color image, to create a preliminary amended-lightness color image as the color image.

9. A color image processing method comprising the steps of:

(a) designating an object color to be converted in an input color image;

(b) setting an optimum color corresponding to said object color designated by said designating step (a);

(c) obtaining a preliminary lightness conversion amount in accordance with a differential value in lightness between said object color and said optimum color;

(d) obtaining a practical lightness conversion amount by compensating said preliminary lightness conversion amount so as to decrease said preliminary lightness conversion amount commensurate with the largeness of said preliminary lightness conversion amount;

(e) obtaining a lightness conversion factor based on said practical lightness conversion amount said object color and said optimum color; and (f) converting the input color image in lightness using said lightness conversion factor to create a lightness-changed color image.

10. A color image processing method according to claim 9, wherein in said practical lightness conversion amount obtaining step (d), said lightness conversion amount such as to approximate a predetermined value is obtained as said preliminary lightness conversion amount increases.

11. A color image processing method according to claim 9, further comprising a step of preliminarily converting the input color image in lightness, based on a histogram or a maximum/minimum/average value of pixel information in the input color image, to create a preliminary amended-lightness color image as the color image.

12. A color image processing method according to claim 10, further comprising a step of preliminarily converting the input color image in lightness, based on a histogram or a maximum/minimum/average value of pixel information in the input color image, to create a preliminary amended-lightness color image as the color image.

* * * * *

UNITED STATES PATENT AND TRADEMARK OFFICE
CERTIFICATE OF CORRECTION

| | | |
|---|---|---|
| PATENT NO. | : 7,016,077 B2 | Page 1 of 1 |
| APPLICATION NO. | : 09/821013 | |
| DATED | : March 21, 2006 | |
| INVENTOR(S) | : Satoshi Semba et al. | |

It is certified that error appears in the above-identified patent and that said Letters Patent is hereby corrected as shown below:

First page, Col. 2, OTHER PUBLICATIONS
      Line 4, delete "Ethic" and insert --Ethnic--, therefor.

\*      First page, Col. 2, OTHER PUBLICATIONS
      Line 5, after "8344" insert --,--.

\*      Col. 26, line 14, after "amount" insert --,--.

Signed and Sealed this

Twenty-ninth Day of August, 2006

JON W. DUDAS
*Director of the United States Patent and Trademark Office*